United States Patent [19]

Merritt

[11] Patent Number: 5,117,789
[45] Date of Patent: Jun. 2, 1992

[54] INTERNAL COMBUSTION ENGINE

[75] Inventor: Dan Merritt, Coventry, England

[73] Assignee: Coventry Polytechnic Higher Education, Coventry, United Kingdom

[21] Appl. No.: 733,205

[22] Filed: Jul. 19, 1991

[30] Foreign Application Priority Data

Jul. 23, 1990 [GB] United Kingdom ............... 9016123.3
Feb. 19, 1991 [GB] United Kingdom ............... 9103391.0
Mar. 23, 1991 [GB] United Kingdom ............... 9106219.0

[51] Int. Cl.$^5$ .............................................. F02B 19/00
[52] U.S. Cl. .................................................... 123/289
[58] Field of Search ................ 123/289, 286, 279, 263

[56] References Cited

U.S. PATENT DOCUMENTS 4,258,680 3/1981 Eckart ................... 123/289
4,485,779 12/1984 Spurk .................... 123/289

Primary Examiner—Raymond A. Nelli
Attorney, Agent, or Firm—Longacre & White

[57] ABSTRACT

An internal combustion engine has first and second cylinders (12, 14), the first cylinder (12) having a larger swept volume than the second cylinder (14) and the second cylinder being formed in the crown of the first cylinder. First and second pistons (16, 18) are reciprocable respectively in the first and second cylinders (12, 14), the second piston (18) being formed as a protrusion on the crown of the first piston (16). The first cylinder has an air inlet (25) and an exhaust outlet (27) whilst a first fuel source (34) provides fuel to the second cylinder (14). The second piston has a crown (35) which is spaced from and connected to the crown (36) of the first piston and which has an edge (37) which is relatively thin in the axial direction compared to the spacing of the first piston crown from the second piston crown. This defines a combustion space (20) between the piston crowns and a side wall (14a) of the second cylinder (14) when the pistons are substantially at the inner dead center position. The combustion space (20) communicates with both cylinders (12,14) during part of the expansion stroke. Inhibiting means is also provided for inhibiting ingression prior to the pistons (16,18) arriving at or adjacent the inner dead center position. This can take the form of a gap (128) between the second piston crown (35) and the second cylinder side wall (14a) with a peripheral groove (39) in the second cylinder wall at its upper end to enable the fuel/air mixture in the second cylinder (14) above the crown (35) to bypass the piston crown when the latter is at its inner dead center position and enter the combustion space (20).

58 Claims, 18 Drawing Sheets

INTERNAL COMBUSTION ENGINE

The present invention relates to an internal combustion engine.

Internal combustion engines can be classified as segregating or non-segregating engines All such engines use a compression stroke which preceeds the ignition and combustion of fuel which is mixed with air.

In a non-segregating engine the fuel is mixed with the air before the start of the compression stroke as is the case with spark ignition gasoline engines commonly called SIGE engines. In some SIGE engines, known as stratified charge engines, which are not now common, the fuel is introduced to the air during the compression stroke but well before ignition which is started with a spark. In all non segregating engines the maximum compression pressure is limited since a pre-mixed air-fuel gas mixture can be ignited by the high temperature generated in the compression process before the spark occurs.

SIGE engines require the air fuel mixture to be nearly chemically correct. This restriction together with lower compression ratios and the need to throttle the air input at part load, which are all associated with this combustion system, result in a relatively poor thermal efficiency for the SIGE engine. Its main advantage is a fast combustion process, hence higher engine speed and power brought about by the fast burn of a pre-mixed gaseous mixture of fuel and air.

A segregating engine will compress all, or most of the air, without fuel and introduce the fuel into the air near the end of the compression stroke at the point where ignition is to be started. The familiar segregating engine is the diesel engine which injects liquid fuel into the combustion chamber, under very high pressure, near the end of the compression stroke.

The segregating engine has the capability of much higher thermal efficiency compared with the SIGE engine, particularly at part load. Its compression pressures, which enhance efficiency, are not limited by the danger of pre-ignition. No throttling is required at part load so avoiding pumping losses. Lean burning at part load is possible which also improves thermal efficiency.

The disadvantage of the diesel segregation method is the relatively long time it takes to inject the liquid fuel and vaporise it before it can ignite and burn fast. The diesel engine is therefore thermally more efficient than the SIGE engine but cannot run at the same high RPM as the SIGE and produces less power from a given size and weight.

Various types of segregating engines invented by the Applicant are known, for example from GB-A-2155546, GB-A-2186913, GB-A2218153 and GB-A-2218157. Those engines are now known in literature as the Merritt engine.

The Merritt engine comprises at least one set of first and second cylinders and respective first and second pistons movable in said cylinders, in each set, the first cylinder having a larger swept volume than the second cylinder and there being an air inlet valve and/or port communicating with the first cylinder, an exhaust valve and/or port communicating with the first cylinder a fuel source for providing fuel to the second cylinder, means defining a combustion space when the pistons are substantially at the inner dead centre position, the combustion space communicating with both cylinders during at least an early part of the expansion stroke, and inhibiting means for inhibiting ingression, that is movement of fuel/air mixture from the second cylinder into the combustion space.

The Merritt engine is therefore a segregating engine like the diesel engine with a difference that some small quantity of the air is compressed with all the fuel in the smaller second cylinder, whereas most of the air is compressed on its own in a larger first cylinder. The very rich fuel/air mixture in the second cylinder will not explode during compression because it is too rich. It is also known that a small quantity of fuel can also be mixed with the air in the first cylinder without exploding during the compression stroke because it is too lean.

An example of the known Merritt engine is shown in FIG. 1 of the accompanying drawings which is a diagrammatic cross section through part of an internal combustion engine. The engine is described briefly below and the reader is directed to GB-A-2218153 for a more detailed description.

The engine 10 includes a first cylinder 12 and a smaller second cylinder 14. A first piston 16 is movable in the first cylinder 12 and is sealed thereto by means of piston rings 16a. A smaller second piston 18 projects from the crown of piston 16 and is movable within the cylinder 14. As will be appreciated the larger cylinder 16, has a larger swept volume than the smaller cylinder 14. The axis of the two cylinders are parallel and although cylinder 14 is shown positioned concentric in relation to the larger cylinder 12, it can be arranged in any suitable position i.e. eccentrically of the cylinder 12. The stroke of the first piston 16 is preferably arranged such that the second piston 18 projects into the cylinder 14 even at its outer dead center position. The outer dead center position of the crown of piston 16 is indicated in broken lines in FIG. 1. The pistons 16, 18 share a common crankshaft C and connecting rod mechanism although two separate pistons and two separate crankshafts have also been described in GB-A-2218153. A combustion space in the form of a combustion chamber 20 is contained within the second piston 18 and communicates with both the first cylinder 14 and the second cylinder 12 via two ports 28 and 29. Port 28 comprises the aforesaid inhibiting means.

Port 28 which connects the combustion chamber 20 with the second cylinder 14 (which contains the fuel as described below) affects what is known as "ingression" in the Merritt engine which, in turn, affects the timing of the ignition. In the Merritt engine, the term "ingression" describes the movement of fuel/air mixture from the second cylinder into the combustion space.

The engine shown in FIG. 1 is a four stroke version of the Merritt engine. In operation, the charge of substantially air is admitted to the major cylinder from an inlet duct 25 via an inlet valve 24. Some of this air enters the second cylinder 14 through port 28 and port 29 during the induction stroke. Liquid fuel is delivered to the second cylinder 14 by means of an injector 21 and delivery of fuel can take place during the induction stroke and, if necessary, during the early part of the compression stroke.

Compared with the segregating diesel engine where fuel is injected into the engine at the end of the compression stroke, the Merritt engine allows fuel to be delivered to the engine for a substantially longer part of the cycle period of the engine. In that way, the fuel is given longer to vaporise from liquid to gas but not to mix fully with most of the compressed air originally in the first cylinder 12 until combustion is under way in the combustion chamber 20. It has been established and made known in the previous Patent Applications of the Applicant that with such an arrangement of unequal swept volume cylinders communicating with a common combustion chamber and where the fuel is contained in the smaller cylinder, a process referred to herein as "gas dynamic segregation" results.

Gas dynamic segregation is distinguished from the mechanical type segregation of the diesel engine where a mechanical valve device (typically a needle valve in the fuel injector) shuts off the fuel supply to the engine until the moment of fuel delivery. In the gas dynamic segregating process produced in the Merritt engine, the air contained in the larger first cylinder and combustion chamber is known to move into the smaller second cylinder during most of the compression stroke. In FIG. 1, this creates a flow of air through port 28 which connects the combustion chamber 20 and the second cylinder 18 where all, or most, of the fuel is contained, thus stopping the movement of fuel into the combustion chamber. Near the end of the compression stroke, the gas flow is reversed as the pressure in the second cylinder 14 becomes greater than that in the combustion chamber 20 and the fuel supplied from the injector 21 which has vaporised in the smaller cylinder 14 together with a small proportion of the air has to enter the combustion chamber 20.

The present invention seeks to provide an improved internal combustion engine.

According to one aspect of the invention there is provided an internal combustion engine comprising:

at least one set of first and second cylinders, the first cylinder having a larger swept volume than the second cylinder;

respective first and second pistons movable in said cylinders;

air inlet means communicating with the first cylinder;

exhaust means communicating with the first cylinder;

a first fuel source for providing fuel to the second cylinder;

means defining a combustion space when the pistons are substantially at the inner dead centre position, the combustion space communicating with both cylinders during the expansion stroke;

inhibiting means for inhibiting ingression prior to the second piston arriving at or adjacent its inner dead centre position;

and wherein the second piston has a crown which is spaced from and connected to the crown of the first piston and which has an edge which is relatively small in the axial direction compared to the distance between the first piston crown and the second piston crown in the axial direction, thereby to define said combustion space between said piston crowns and a side wall of said second cylinder.

A preferred form of the invention has access means associated with the second cylinder to control the pressure in the second cylinder to a value below the pressure in the first cylinder during an early part of the compression stroke, thereby to inhibit ingression prior to the second piston arriving at or adjacent its inner dead centre position. Bearing in mind that the pressure in the second cylinder at the end of the compression stroke affects the timing of ingression, ingression timing can be controlled so as to provide optimum ignition timing. Ingression should be arranged to occur towards the end of the compression stroke, e.g., within 25° before inner dead centre.

The access means preferably includes a first port means opening into the second cylinder and a first valve means for controlling the first port means. The latter is preferably openable at the start of the induction stroke and closable during the early part of the compression stroke. The closing time has a direct influence on ingression timing. Conveniently, the valve means may comprise a poppet valve operable mechanically or electrically. The use of a poppet valve may enable a readily available type of valve to be utilised and where an electrically operable valve is used, particularly fine control of the valve opening duration and closing time is possible to control the admission of the mixture.

The access means may further include a first variable flow area valve means, for example, a butterfly or throttle valve preferably arranged upstream of said first valve means. By using such a variable flow area valve means, air flow through the valve means can be accurately controlled enhancing control over the time of ingression.

The fuel source, which may comprise a liquid fuel injector, is preferably arranged upstream of the first valve means. Suitable means for timing the introduction and duration of fuel delivery from the fuel source may be provided so that the fuel will be introduced during a period in which the valve means is either open or closed. The access means may be controlled by control means such as an engine management system.

In the engine shown in FIG. 1, the combustion chamber 20 is formed within the second piston 18 and whilst such an arrangement is acceptable in many respects, such a combustion chamber can present some manufacturing difficulties. Such difficulties can be overcome by providing an arrangement in which the combustion chamber is only partially formed within the second piston 18. In such an arrangement the second piston can have a crown which is spaced from and connected to the crown of the first piston and which has an edge in the axial direction which is relatively thin compared to the spacing of the first piston crown from the second piston crown, in the axial direction, the second piston crown preferably always remaining in the second cylinder. In that way, it is possible to define a combustion space between the two piston crowns which avoids the need to provide the combustion chamber fully enclosed within the smaller piston itself.

The second cylinder may be formed so as to provide an abrupt or gradual ingression characteristic. For example, the second cylinder may be formed at its end remote from the first cylinder with means for defining a by-pass around the edge of the second piston crown when the second piston is at or adjacent or substantially at its inner dead centre position. In that way, the peripheral edge of the second piston crown may lie close to the wall of the second cylinder during the majority of the piston stroke. However, once the edge of the second piston crown lies adjacent the by-pass, the gap between the peripheral edge of the second piston crown and the wall of a second piston effectively increases to enable rapid ingression through the by-pass. The by-pass preferably has an axial length which is greater than the thickness of the edge of the second piston crown. Conveniently, the by-pass may take the form of a groove formed in the wall of the second cylinder which may extend over the whole or part of the circumference of the second cylinder.

The provision of the groove is most beneficial in that it provides a clearance volume for vaporised fuel and air in the second cylinder which delays ingression and also provides a path for flame from the combustion space to reach any fuel remaining above the first piston crown after ingression. Also the provision of the groove can help exhaust gases remaining above the second piston crown to escape at the end of the exhaust stroke.

The by-pass may be defined by an abrupt or gradual enlargement of the bore of the second cylinder depending upon whether or not an abrupt or gradual ingression is required.

The combination of the use of a second piston with a thin edged crown and the bypass means to trigger ingression can allow a much reduced gap between the piston edge and the second cylinder side wall to be used. In fact, the gap can be omitted altogether and replaced with a sliding seal attached to the edge of the second piston crown, for example, a piston ring. The seal need not be perfect and a very small gap may be used instead. In such an arrangement the use of the access means to provide air into the second cylinder is necessary and the access means can also be used to remove exhaust gas from the second cylinder.

By providing the second piston crown with a small edge the onset of ingression can be triggered by the bypass means which, when interacting with the thin edge of the small piston crown, allows a bypass path for the gas in the second cylinder above the second piston crown across the piston edge when the second piston approaches its inner dead centre position. Such an arrangement allows the use of two alternative forms of inhibiting means to promote segregation between the gases in the second cylinder above the second piston crown and the air in the combustion space below it prior to ingression.

The first form of inhibiting means is, as mentioned above, a suitably designed gap between the edge of the crown of the second piston and the second cylinder wall. With such a gap provision must be made to control the gas pressure in the second cylinder above the crown of the second piston to remain below the air pressure in the combustion space on the other side of the second piston crown until the moment of ingression. Such control can be effected by the access means as described above.

The second form of inhibiting means is the above-mentioned slidable seal between the edge of the crown of the second piston and the second cylinder wall. In this case it is less important to provide a pressure difference across the second piston crown to assist the segregation process. Ingression is still possible when the sealed edge of the second piston crown is uncovered by the bypass.

The first form of the inhibiting means may be formed in a straightforward manner. The edge of the second piston crown may be radially spaced from the adjacent wall of the second cylinder to define the gap which provides this inhibiting means. In that way, it is particularly easy to form the inhibiting means around the edge of the second piston and the arrangement is particularly advantageous in that respect.

In one embodiment, the gap is a continuous annular clearance between said edge of the second piston crown and the adjacent wall of the second cylinder. In another embodiment, the gap is interrupted by two or more radial projections on the second piston crown. One or more of the projections can conveniently slidable on the adjacent wall of the second cylinder to provide side-to-side support for the second piston. Alternatively, the gap may be interrupted by two or more axially extending radial projections on a wall of the second cylinder to provide sliding support for the piston crown during its movement.

The piston construction can take various forms.

For example, the second piston crown may be spaced from the first piston crown by means of at least one pillar, e.g., a single central pillar.

The pillar may be so shaped to provide a curved combustion space wall. The curved wall can be contoured so as to enhance swirling of the air entering during the compression stroke to assist with the mixing of such air with the vaporised fuel/air mixture as it ingresses into the combustion chamber and that can be particularly advantageous.

If desired, the second piston may alternatively have a cylindrical skirt extending between its crown and the crown of the first piston, the skirt being formed with a plurality of apertures of substantial size which leave a plurality of second piston crown portions having relatively thin edges.

It is most desirable that the fuel/air mixture is burned as fully as possible in the combustion space before the combustion space fully communicates with the first cylinder during the expansion stroke. To assist in achieving that, the first piston crown may be formed with a raised portion or plug which fits with working clearance into the second cylinder in order nearly to shut off the combustion space from the first cylinder when the piston reaches or substantially reaches the inner dead centre position. The second cylinder need not be of cylindrical shape since the second piston does not need to fit sealingly with piston rings therein. Therefore the base can be of a shape appropriate to the selected second cylinder cross-section.

When such a raised portion is provided then a passage means may be provided interconnecting the space above the crown of the second piston with the first cylinder for enabling transfer of air from the first cylinder to the second cylinder when the pistons are adjacent the inner dead centre position for assisting ingression.

Conveniently, following ingression, the fuel may be ignited by contact with hot compressed air in the combustion space. However, if desired, ignition of the fuel may be assisted by means of a spark plug, catalyst or other ignition means which communicates with or is associated with the combustion space. Where a catalytic ignition means is provided, it is placed in the combustion space, for example on the underside of the second piston crown but not on the second cylinder wall.

The second cylinder may be formed at its end nearest the first cylinder with a second by-pass means, for example a groove similar to that described previously for the first by-pass means. The second by-pass allows gases to by-pass the second piston crown at its outer dead centre position and this is beneficial for equalising pressure across the second piston crown at the beginning of the exhaust process during the stage known as the blow down stage.

One of the advantages of having a piston in which the second piston crown has a thin peripheral edge with the combustion space defined between the first piston crown and the underside of the second piston crown is that the engine may allow the combination of the gas segregation principle with the familiar diesel engine and SIGE engine combustion systems so conferring benefits to both of these familiar engine systems when operating as hybrids with a Merritt engine made in accordance with the present invention.

Such diesel hybrid systems allow some of the fuel to be vaporised, segregated by the Merritt engine principle, and then ignited to provide a flame to assist the vaporisation and burning of the remaining fuel injected in a diesel engine mode.

Throttle means may be positioned upstream of said air inlet means communicating with said first cylinder for enabling the restriction of air supply to said first cylinder during engine part load conditions.

In an SIGE hybrid arrangement, a spark plug may be arranged in a wall of the second cylinder such that when a crown of the second piston is at or adjacent it inner dead centre position, the spark plug can assist in the ignition of fuel/air mixture in the combustion space behind the second piston crown.

In a first operative mode, the said inlet valve may be arranged to admit to the first cylinder a throttle valve controlled mixture of fuel and air capable of spark ignition whereby, with the said fuel source and air supply to the second cylinder inoperative, the inlet valve admits said air/fuel mixture into the first cylinder to be ignited by said spark plug when the pistons are near the inner dead centre position, and in a second operative mode the inlet valve admits substantially only air to the first cylinder and the fuel source and air supply are operative to deliver fuel and air to the second cylinder to operate in the Merritt engine mode.

Where fuel from the first fuel source is admitted through the aforesaid access means associated with the second cylinder, the engine may operate on a two stroke cycle. In an example of such an arrangement, said air inlet means is provided for admitting at above atmospheric pressure substantially air only to the first cylinder, said exhaust means is provided for the first cylinder, the second piston is mounted on the first piston and air is also supplied above atmospheric pressure to the second cylinder through said access means together with fuel from said first fuel source. If desired, air may be supplied to both cylinders from the same source, e.g., a crank case of the engine.

The two stroke cycle is particularly suitable for use with the Merritt Engine segregating principle and can incorporate any of the features which control segregation in the four stroke cycle such as the first and second by-pass grooves, the thin edged crown of the second piston, the raised portion for closing the combustion space at inner dead centre and the access means provided for the second cylinder including a valve, with or without an additional throttle valve. In such an engine:

(a) the second piston can easily be positioned concentrically with the first as there is no need to make space for any valve above the first piston;

(b) the removal of exhaust gases from under the crown of the second piston is easily achieved during the two-stroke scavenge period due to the open nature of the combustion space;

(c) fuel which enters the second cylinder can not easily escape into the exhaust port during the exchange of gases at the end of the expansion stroke as it is separated from the exhaust port by the second piston crown.

In another arrangement in accordance with the invention, the first piston may be operated by a first crank and the second piston operated by a second crank, the two cranks being mechanically coupled together rotatable in or slightly out of phase. The inhibiting means may be defined by an opening interconnecting the first and second cylinders and the crown of the first piston may include a recess adjacent the opening which defines a combustion space. The fuel source is preferably arranged to inject fuel into the second cylinder. In one embodiment of such an arrangement, a further fuel source such as a diesel fuel injector can be provided in the first cylinder so as to inject fuel into the combustion space. In another embodiment, a spark plug may be provided associated with the first cylinder to assist ignition of the fuel in the combustion space.

Internal combustion engines in accordance with the invention will now be described with reference to the remaining accompanying drawings in which:

FIG. 1 demonstrates the airflow through port 28,

FIG. 2 is a diagrammatic cross section of part of an internal combustion engine in accordance with the invention, FIG. 3 is a diagrammatic cross section through another type of internal combustion engine in accordance with the present invention in which the first and second piston crowns are interconnected by means of a central pillar of the second piston, FIGS. 3A is an enlarged view of part of FIG 3 showing gas movement, FIG. 3B shows a variation of FIG. 3A, FIG. 4 is a cross section through part of a practical form of an engine similar to that shown in FIG. 3, FIG. 5 is a cross section similar to FIG. 4 but showing the addition of a spark plug for starting and idling the engine and a throttle valve, FIG. 6 is a cross section similar to FIG. 4 but showing a first diesel hybrid engine in accordance with the present invention, FIG. 7 is another cross section showing an alternative diesel hybrid engine in accordance with the present invention, FIG. 8 is a cross section similar to FIG. 4 but showing a hybrid spark ignition engine in accordance with the present invention.

FIG. 8A is a diagrammatic cross section showing the engine of FIG. 8,

FIG. 9 is a diagrammatic cross section showing a raised portion on the first piston and a passage through the second piston in accordance with the present invention, FIG. 9A is a diagrammatic cross section showing an alternative form of pistons of FIG. 9, FIG. 10 is an elevation of part of a modified smaller piston in its cylinder, FIG. 10A is a transverse cross section through a second cylinder modified to provide an alternative to the FIG. 10 arrangement, FIG. 11 is a plan view of the piston in FIG. 10 looking in the direction of arrow XI in FIG. 10, FIG. 12 shows a further form of second piston, FIG. 13 is a cross section of the piston shown in FIG. 12 on the line XIII—XIII in FIG. 12, FIG. 14 shows a still further second piston construction, FIG. 15 is a diagrammatic cross section through an engine in accordance with the present invention operating on a two stroke principle, FIG. 15A is an enlarged view of part of the engine shown in FIG. 15, FIG. 16 is a practical form of an engine similar to that shown in FIG. 15, FIG. 17 is a diagrammatic cross section through part of a further type of internal combustion engine in accordance with the present invention, FIG. 18 is a diagrammatic cross section through part of a further type of internal combustion engine in accordance with the present invention, FIGS. 18A and 18B are enlarged views of part of the engine of FIG. 18, and FIG. 19 shows an alternative engine in accordance with the invention operable as a diesel hybrid in which the first and second pistons are operated from respective mechanically coupled crankshafts rotatable in or out of phase.

FIG. 2 is similar to the engine shown in FIG. 1 in so far as the second piston 18 projects from the crown of first piston 16 and the combustion chamber 20 is formed in the piston 18, the combustion chamber communicating with the second cylinder 14 through port 28 and communicating with the first cylinder 12 through port 29. The inlet and exhaust valves 24, 26 are, diagrammatically shown arranged to one side of the engine and the second piston 18 is arranged eccentrically on the first piston 16.

In accordance with the present invention, access means indicated generally at 30 includes a second inlet valve 31 and a throttle valve 32 (variable flow area valve). The valve 31 is arranged to admit air from an inlet duct 33 provided with a liquid fuel injector 34. During the induction stroke, the inlet valve 24 admits substantially air only to the first cylinder 12. Fuel from the injector 34 is delivered to the inlet duct 33 either during the period that the second inlet valve 31 is opened, or when it is closed or during both periods. At the start of the induction stroke, the second valve 31 opens and injected fuel and air are delivered to the second cylinder such as to ensure that the instantaneous pressure in the larger first cylinder 12 is greater, or equal to, the pressure in the smaller second cylinder 14 during the early part of the compression stroke. Closing valve 31 after valve 24 and/or a partial closing of throttle valve 32 can promote such an effect.

The positioning of the injector 34 upstream of the valve 31 protects the fuel injector from combustion pressures and temperatures which is advantageous.

During the compression stroke, air from the larger cylinder 12 is compressed and some of the air moves into the combustion chamber 20 because of pressure difference. Fuel in the air delivered to the smaller cylinder 14 via valve 31 vaporises during the induction and compression strokes as the smaller piston 18 nears its inner dead centre position. The fuel/air proportions entering through the second inlet valve 31 are outside the rich flammability limit range and will not spontaneously ignite by compression temperature alone in the smaller cylinder 14 above piston 18. The pressure of the vaporised fuel and air eventually becomes higher than the pressure of the air in the combustion chamber and the fuel/air mixture ingresses through the inhibiting port 28 into the combustion chamber 20 where it is ignited by the air at high temperature in the combustion chamber. The cooling influence of vaporising fuel in the second cylinder above the piston crown and the resulting lower pressure therein during the compression stroke will maintain the temperature of the fuel/air mixture below that of the air entering the combustion chamber 20 from the larger cylinder 12. The piston passes over inner dead centre and during the expansion stroke gases from the combustion chamber 20 pass into the larger cylinder 12 through the port 29, the outlet orifice 29a of which effectively begins to increase in area as it clears the lower edge of the second cylinder wall during the early part of the expansion stroke.

If desired, the combustion chamber 20 can be provided with a thin platinum layer or other catalyst on its wall which will aid ignition of the mixture entering the combustion chamber 20 following ingression. During the exhaust stroke, exhaust gases are evacuated from the larger cylinder 12 through the exhaust duct 27 via exhaust valve 26.

By controlling the access means 30, the pressure in the smaller cylinder 14 can be controlled accurately to provide optimum timing of ingression which will, in turn, control ignition timing to give optimum running characteristics of the engine over its full speed and load range. The operation of the throttle valve 32 and also the operation of the injector 34 may be controlled by an engine management system M.

Throttle valve 32 is needed if valve 31 is not provided with means to change its lift and/or operating crank angle arc, for example a cam operated valve. It may not be needed if the quantity of air delivered through valve 31 can be directly controlled by valve 31 itself, for example by using an electro magnetic valve actuating mechanism.

As mentioned above, the combustion chamber 20 within the smaller piston 18 can present certain manufacturing difficulties and reference is now made to FIG. 3 which shows an engine in accordance with the invention having an alternative type of piston which enables a combustion space to be produced more easily and also gives a number of other important advantages. In FIG. 3, the large and small pistons, the inlet and exhaust valves, the access means and other parts corresponding to parts shown in FIG. 2 carry the same reference numerals.

In FIG. 3 the smaller piston 18 is concentric with the larger piston 16 (although concentricity is not essential as the piston 18 may be arranged eccentrically to the piston 16). The piston 18 includes a pillar 234 and a raised portion or base 84 by which a crown 35 of the piston 18 is connected to or integral with the piston 16. The connection may be nonrigid i.e. flexible or resilient e.g. a ball swivel joint. Although crowns 35 and 36 are shown flat, either or both may be curved, for instance domed or frusto conical with matching cylinder head surfaces. It will be seen from FIG. 3 that the pillar 234 is curved in contour, the curve encouraging swirl of the air entering the combustion space 20 from larger cylinder 12 and swirl of the fuel/air mixture following ingression into the combustion space 20. The combustion space 20 is defined between the pillar 234 and the wall, indicated generally at 14a, of the smaller cylinder 14. The shape and size of the pillar are chosen to produce a suitable combustion volume of appropriate size and shape.

It will be noted that the crown 35 of the piston 18 has an edge with an axial thickness "t" which is substantially less than the axial distance between the crowns 35 and 36 of the pistons 18 and 16. The crown 35 has a cylindrical or otherwise shaped peripheral edge 37 which is spaced slightly away from the wall 14a of the second cylinder to define inhibiting means in the form of an annular gap 128 which performs a function equivalent to the inhibiting port 28 in FIG. 3 and constitutes all or part of the aforesaid inhibiting means. The upper end of the smaller cylinder 14 as viewed in the drawing is formed with an optional peripheral groove 39 which, when present, provides a by-pass to promote ingression as described below. The upper end of the smaller cylinder 14 is provided with the access means indicated generally at 30 comprising the second inlet valve 31 and the throttle valve 32. The injector 34 is provided as in FIG. 2 for delivering liquid fuel into the inlet duct 33. As in FIG. 2, the throttle valve 32 controls the quantity of air flowing through the inlet duct 33 and does so substantially independently of the quantity of the fuel delivered by the fuel injector 34.

During the induction stroke of the engine. Air enters the larger cylinder 12 through the inlet duct 25. Air also enters the smaller cylinder 14 through open valve 31 along with fuel from injector 34. The throttle valve 32 controls the air mass entering the smaller cylinder 14 and can ensure that during the induction stroke of the engine, the air/fuel mixture entering the smaller cylinder 14 through the inlet valve 31 will normally be below the pressure in the larger cylinder 12. The timing of the closure of valve 31 after the closure of inlet valve 24 during the early part (during part or all of the first half) of the compression stroke can also ensure that the pressure in the second cylinder 14 is below the pressure in the first cylinder 12 when valve 31 closes. The difference in pressure across the crown 35 of the piston 18 during the compression stroke will, as in FIG. 2, have an effect on the timing of ingression of contents of the smaller cylinder 14 into the combustion space 20 near the inner dead centre position of the piston 18 at the end of the compression stroke. This, in turn, controls the timing of the ignition of vaporised fuel by, for instance, compression ignition when the fuel/air mixture in cylinder 14 meets the relatively hotter air delivered to the combustion space 20 by the larger piston 16 during the compression stroke.

Adjustment of the position of throttle valve 32 and/or the closure of valve 31, which may be carried out by the engine management system M can be used to control the timing of the ignition in the engine over the full range of engine speed and fuel quantities. The fuel quantity will normally be determined by the power output required by the operator so need not be directly controlled by the position of throttle 32 as is the case in a normal spark ignition engine.

During the induction and compression strokes of the engine, the fuel entering the second cylinder via second inlet valve 31 vaporises in the smaller cylinder 14. Near the inner dead centre position, towards the end of the compression stroke the peripheral edge 37 of the crown 35 reaches the position shown in broken lines adjacent the by-pass 39 which effectively increases the size of the inhibiting means and the air/fuel mixture in vapour form rushes around the peripheral edge 37 through the by-pass 39 and into the combustion space 20. Also towards the end of the compression stroke the optional base 84 enters the second cylinder 14 partially isolating the combustion space 20 from the first cylinder 12. The air in the combustion space is compressed and is at a sufficiently high temperature to cause spontaneous ignition of the fuel/air mixture entering the combustion space and expansion of gases in the combustion space then forces the pistons 16, 18 downwardly to start an expansion stroke. The ingression process is substantially completed by the time the smaller piston 18 reaches its inner dead centre position. Consequently the beginning of combustion may occur prior to the inner dead centre position and could result in premature and undesirable pressure increase on the crown 36 of the larger piston 12. The use of base 84 may help to delay the pressure increase on crown 36 of the larger piston until after the inner dead centre position has passed. Further details of base 84 are described later. As shown in FIG. 3a, the axial length 1 of the groove 39 is greater than the thickness t of the second piston crown 35 to provide an enlarged gap for the fuel/air mixture N to ingress around the crown through the by-pass groove 39.

The cross sectional shape of the groove 39 may vary from that shown in FIGS. 3 and 3A, for example as shown in FIG. 3B, the groove may have a frusto-conical lower wall 39b which provides a gradual rather than an abrupt increasing gap as the piston 18 nears its inner dead centre position. FIG. 3B also shows an optional piston ring 38 (described in more detail with reference to FIGS. 18 to 18B) which can be used efectively to seal across the piston crown 35 and cylinder wall 14a until it reaches the groove 39.

The groove 39 also provides a clearance volume in the second cylinder 14, that is a volume which is not diminished by movement of the piston 18 in the second cylinder. The clearance volume effectively delays ingression timing by providing extra volume for the fuel/air mixture in cylinder 12 during the compression stroke but which communicates with the combustion space 20 at the time of ingression. Another function of the groove 39 is to allow the flame and the resulting pressure increase in combustion space 20 to communicate with the space above the second piston crown 35 even when the piston ring 38 is used as an option. In that way the flame can burn off any fuel which remains above the second piston crown 35 following ingression.

In order to locate the second piston crown 35 when it moves into the by-pass zone, the groove 39 may be interrupted by a plurality of areas 39a (see FIG. 16) forming continuations of the bore wall 14a.

The combustion space 20 is an "open" combustion space when compared to the combustion chamber 20 of FIG. 2 and provides a less restricted removal of post combustion gases from the combustion space to the first cylinder 12 than with the relatively closed combustion chamber shown in FIG. 2.

During the exhaust stroke, gases trapped above the second piston crown 35 will be transferred to the combustion space 20 and first cylinder 12 through the gap 128 by the rising second piston 18. Where the by-pass 39 is provided, it will assist escape of such exhaust gases at the end of the exhaust stroke.

If the gap 128 is small or absent altogether when a piston ring 38 is used valve 31 may also be used to allow exhaust gases out of cylinder 14 during the exhaust stroke. This will require valve 31 to open and close twice in a cycle, once during the induction stroke and again during the exhaust stroke. The exhaust gases in cylinder 14 may contain unburnt fuel and can be readmitted to cylinder 14 during the next induction stroke together with a new fuel charge. In this way unburnt fuel can remain in the engine. Alternatively a second exhaust valve 150 may be used as shown in FIG. 18 together with the piston ring 38. In the embodiment shown in FIG. 18 the exhaust duct 151 may also be connected to the inlet duct 33 although this is not shown.

Whilst the small cylinder 14 is shown with a by-pass groove 39 at its upper end, it will be appreciated that the size of the gap 128 can be selected so that the gap 128 alone i.e. without the by-pass 39, provides the entire inhibiting means forming the passageway for ingression. In such a case, the size of the gap 128 is carefully chosen to ensure adequate segregation between the upper surface of crown 35 and the combustion space 20 during most of the compression stroke.

It will be appreciated that the fixed port 29 of FIG. 2 is not present in the embodiment of FIG. 3. Instead, it is effectively replaced by an annular gas escape area 129 between the crown 36 of the first piston 16 and an edge 14b of the lower end of the second cylinder 14. As the pistons descend during the expansion stroke, the annular escape area 129 rapidly increases to promote substantially unhindered transfer of gases from the combustion space 20 to the first cylinder 12.

The crown 35 will be cooled by the incoming fuel and air entering through second inlet valve 31, by the effect of vaporisation of the fuel in the air during the compression stroke and by conduction of heat through pillar 234.

The exhaust process can benefit from the provision of a bypass groove 135 at the lower end of the second cylinder 14 as described with reference to FIGS. 15 and 15A. The groove 135 allows a blow-down stage of the exhaust process in the second cylinder 14 to escape into the first cylinder 12 and from there to exhaust valve 26. Following the blow-down stage of the exhaust process and if piston ring 38 is used exhaust gases may either be trapped above the piston crown 35 during most of the exhaust stroke until released through the bypass 39 nearer the end of the exhaust stroke, or be allowed out of cylinder 14 through valve 31 which can be opened during the exhaust stroke, as described earlier. In such a case fuel injection by the injector 34 commences after the exhaust process is completed. If the piston ring 38 is omitted and gap 128 used instead, exhaust gases can transfer from above the piston crown 35 into the exhaust duct 27 during most of the exhaust stroke.

An advantage of an arrangement which uses valve 31 as a dual inlet and exhaust valve is that any unburnt fuel remaining in cylinder 14 at the end of the exhaust stroke need not leave the engine, so reducing exhaust pollution.

Reference is now made to FIG. 4 which illustrates a preferred practical version of the engine shown in FIG. 3. In FIG. 4, parts corresponding to those parts shown in FIG. 3 carry corresponding reference numerals and will not be described in detail.

With reference to FIG. 4, an engine cylinder block 40 is formed with cooling galleries 41 and defines the larger first cylinder 12 and the smaller second cylinder 14. The main inlet duct 25 is open and closed by the inlet valve 24 which is operated by a cam 42 on a cam shaft 43. The valve 24 is slidably mounted in a conventional type of valve guide 44 and has a collet 45 at its upper end to assist in location of a valve spring 46 shown in broken lines.

The second inlet valve 31 is operated by a cam 47 on camshaft 43 through a rocker arm 48. The second valve 31 also includes a collet arrangement 49 which assists in location of a valve spring 50 shown in broken lines. The smaller piston 18 has a pillar 234 curved in contour terminating at an outwardly flared and curved upper end immediately beneath the piston crown 35. The exhaust valve 26 and exhaust port 27 are not shown in FIG. 4 but, are nevertheless, present in the engine in communication with larger cylinder 12. The operation of the engine shown in FIG. 4 is the same as that as described with respect to FIG. 3. In FIG. 4, the full line position of the pistons indicates the outer dead centre position and a near inner dead centre position of the pistons is indicated in broken lines.

Another advantage of the use of an "open" combustion space arrangement is that it permits access by a spark plug or glow-plug directly into the combustion space 20. In that respect reference is now made to FIG. 5 which is identical to FIG. 4 except for the presence of such a spark plug 52 extending through the wall 14a of the second cylinder 14. The spark plug may be used to assist in the initiation of ignition particularly at cold start-up times and idling.

If desired the larger cylinder 12 can be provided with a flow control device 23 such as a throttle valve or an on/off fixed area restrictor to reduce the air intake to the larger cylinder 12 during the induction stroke at part load. Similar reduction to the air entering the second cylinder 14 may be needed, using the throttle valve 32 in order to maintain the pressure difference between the cylinders which promotes segregation. Connecting the inlet ducts 33 and 25 as shown in dotted lines in FIG. 18 can also achieve this condition. For a given quantity of fuel required at part load, this control will increase the fuel/air ratio in the smaller cylinder 14 so avoiding spontaneous ignition by compression, in the smaller cylinder, when the fuel air ratio of the mixture inside it approaches the flammability limit. The peak compression pressure and temperature will also be reduced as a result of such flow reduction and the fuel/air mixture may ultimately need the assistance of the spark plug 52 after ingression. For example, the engine may be made to idle when the fuel/air mixture in the smaller cylinder 14 is chosen to be chemically correct, that is around stoichiometric. The throttling process can reduce the compression pressures to be low enough to avoid spontaneous compression ignition and the spark plug can then be used to ignite the chemically correct mixture entering the combustion space 20 after ingression.

It will be seen from FIG. 5 that a cavity 52a is defined at the cylinder end of the spark plug 52. In order to avoid the cavity 52a acting as an unwanted by-pass for gas across the second piston crown 35, the spark plug 52 should be positioned appropriately within the smaller cylinder 14. Alternatively the volume of the cavity 52a may be minimised, for example, by using a suitable type of spark plug.

Another advantage of using the "open combustion chamber" arrangement is that it enables hybrid engines in accordance with the invention to be produced which can benefit from the advantages of the Merritt Engine segregation system.

A first such hybrid arrangement is shown in FIG. 6 in which parts corresponding to parts shown in FIG. 4 carry the same reference numerals. In FIG. 6 a second fuel source in the form of an injector 60 is provided, the first fuel source (injector 34) being arranged to deliver fuel into inlet passage 33 as before. On comparing FIGS. 4 and 6, it will be noted that the injector 34 has been moved to a position between the passage 33 and a rocker cover 62 of the engine.

During the induction stroke, valves 24 and 31 are opened to enable substantially unthrottled air to be admitted into the larger cylinder 12 and fuel and air to be admitted to the smaller cylinder 14 via the inlet valve 31. However, whereas in FIG. 4, the injector 34 provides substantially the whole of the required quantity of fuel for combustion in the engine, the injector 34 in the FIG. 6 arrangement provides only a fraction of that quantity. As the piston 18 nears its inner dead centre position as shown in broken lines in FIG. 6, the crown 35 moves beyond the outlet of injector 60 at which point the injector 60 delivers its charge of fuel, in diesel engine fashion directly into the combustion space 20 beneath the piston crown 35.

As the piston 18 nears its inner dead centre position, the vaporised fuel and air mixture above the crown 35 ingresses to the combustion space 20 through the gap 128 defined between the edge 37 of the piston and the wall 14a of the smaller cylinder, now enlarged through by-pass groove 39. Such ingression is also possible if the gap 128 is very small or absent, if groove 39 is provided. During the compression stroke, air from the larger cylinder 12 will have entered the combustion space and will be at a temperature sufficient to ignite the ingressed fuel/air mixture. The injector 60 is timed to deliver its fuel charge under pressure into the combustion space 20 so as to provide extremely rapid ignition thereof in the presence of the burning ingressed mixture. In that way, the engine utilises both the fuel segregation method typical of the diesel engine in the form of injector 60 and the segregation method of the fuel typical of the Merritt Engine described here. Such a combination of the diesel engine and Merritt Engine principles will enable a diesel engine to operate at high fuelling rates with very little, if any, smoke emission and may also enable diesel engines to operate at lower compression ratios and at higher engine speeds. The combination considerably increases the speed of combustion compared with a diesel engine unaided by the Merritt Engine principle.

The amounts of fuel delivered by the injectors 34 and 60 and the timing thereof will be controlled by means such as an engine management system in order to provide the correct proportions of fuel between the injectors 34 and 60 for given running requirements so as, for example, to minimise smoke emission in the exhaust gases.

In FIG. 6 and the previous configurations in which injector 34 is situated upstream of valve 31, the fuel line pressure delivery to injector 34 can be relatively low, e.g., under 10 bar whereas injector 60 is typical of a diesel injector requiring a fuel line pressure of a much greater magnitude in order to overcome combustion pressure.

A second diesel hybrid engine is illustrated in FIG. 7.

FIGS. 4 and 7 carry the same reference numeral and will not be described in detail. In FIG. 7, the injector 34 is omitted and the entire quantity of fuel is provided by a single controlled injector 70 positioned in a similar place as the injector 60 in FIG. 6. Injector 70 would be a high pressure diesel type injector capable of discharging fuel in two or more distinct pulses for example a solenoid controlled diesel injector. The pulses may be of different duration and the injector may discharge at different flow rates during each pulse. An injector which can provide a continuous fuel discharge starting with a low flow rate and proceeding to a higher flow rate is also suitable. During induction, air is admitted to the larger cylinder 12 through inlet valve 24, second inlet valve 31 opens to admit substantially air only and a proportion of the total fuel charge is injected by injector 70 into the smaller cylinder 14 above the piston crown 35. By the time piston 18 nears its inner dead centre position as shown in broken lines, the fuel in the fuel and air mixture above the crown 35 vaporises and eventually ingresses into the combustion space 20 whereupon it is ignited by the compressed hot air therein. The injector 70 is then pulsed for a second time and delivers the remaining charge of fuel into the burning mixture in combustion space 20 whereupon the fuel burns rapidly as in the arrangement in FIG. 6. If desired, the fuel can be injected into the space above piston crown 35 on the first pulse of the injector 70 during the compression stroke instead of the induction stroke or during both induction and compression strokes.

Instead of being injected twice per cycle, it is envisaged that a continuous and longer injection can be effected and as the smaller piston crown 35 passes the injector, the rate of fuel delivery can increase to deliver more fuel directly to the combustion space. The engine then operates as before with the same advantages.

With the diesel/Merritt hybrid of FIGS. 6 and 7 it will be appreciated that the two combustion systems run concurrently.

In a third hybrid arrangement, the Merritt segregation system can be combined with the spark ignition engine principle in which fuel and air are premixed at least during the compression stroke for subsequent ignition by the spark to produce power. In such a hybrid arrangement, an example of which is shown in FIG. 8, the two combustion principles operate sequentially.

In FIGS. 8 and 8A, parts corresponding to parts in FIGS. 4 and 5 carry the same reference numerals and will not be described in detail. The engine shown in FIG. 8 is constructed in an identical manner to that shown in FIG. 5 with the addition of a fuel/air management system 80 typical of a spark ignition engine. The system 80 includes a fuel dispenser which, in this case is a low pressure injector 82 (but which could comprise a fuel/air metering device such as a carburettor) and a throttle valve 83. Such a system provides close control of the fuel/air proportions to facilitate ignition by spark.

In operation, the engine may be started up and warmed up as a spark ignition engine operating the system 80 with the fuel injector 34 switched off and the throttle valve 32 in the inlet duct 33 closed. During induction a fuel/air mixture is admitted through inlet valve 24 into the larger cylinder 12. During compression the mixture is compressed into the combustion space 20 where it is ignited by a spark from spark plug 52, ignition being timed to take place around inner dead centre shown in broken lines. By opening the throttle valve 83 and increasing fuel supply, the power may be increased. However there will be a limit to the opening of the throttle valve 83 and to the amount of fuel/air quantity which can be drawn into the larger cylinder 12 imposed by the compression ratio of the engine which in the Merritt mode should be sufficiently high to permit compression ignition, whereas compression ignition in cylinder 12 should be avoided in the spark ignition mode of operation.

Once the engine has been warmed up, the injector 82 can be switched off, throttle 83 opened, injector 34 switched on and throttle valve 32 operated normally whereby the engine will operate in the manner described with respect to FIG. 4. The switch over can be made gradually by admitting an increasing amount of spark ignitable mixture through second inlet valve 31 into the second cylinder 14 whilst reducing the quantity of mixture admitted through inlet valve 24 under control of an engine management system.

As well as being useful for start-up and warm up of the engine, the FIGS. 8 and 8A hybrid arrangement can provide the engine with a choice of running modes. The Merritt running mode will be particularly advantageous when requiring part-load fuel economy or when wishing to operate on different fuels, e.g. alcohols which can be supplied to injector 34, the Merritt mode is less sensitive to fuel variation and particularly octane number.

To delay early pressure increase in the larger cylinder 12, after ignition, the base 84 enters the smaller cylinder 14 at around the time of ingression and remains there until the early part of the expansion stroke. In that way the outflow of gases from the combustion space to the larger cylinder 12 is restricted until the piston has started its expansion stroke and the base 84 clears the second cylinder 14. It is to be appreciated that once the base 84 enters the smaller cylinder 14, some clearance should be provided between the side of the base 84 and the wall 14a of cylinder 14 to allow transfer of air remaining in the larger cylinder 12 into the combustion space. The clearance can be provided by forming the base with its edge 84a tapering away from the wall 14a as shown in FIG. 9 or by providing sufficient gap between parallel surfaces of the base 84 and the wall 14a.

Where a tapering embodiment is used the taper may vary axially, e.g. it may be curved in the axial direction. The size of the gap indicated at 85 will be a compromise between the function of delaying pressure transfer to the larger piston until the start of the expansion stroke and allowing sufficient movement of air into the combustion space 20 during the end of the compression stroke.

As shown in FIG. 9, the base 84 may be formed with one or more grooves 86 running from or adjacent the crown 36 of the larger piston 16 towards or into the top of the base 84. The grooves 86 may be inclined, e.g. helical as shown and could have a tangential component to promote swirl to the gas flow occurring through the grooves. That may have a beneficial effect on combustion.

When using a raised portion such as the base 84 a passage 87 may be provided to connect the space above the second piston crown 35 with the first cylinder to enable transfer of air from the first cylinder to the second cylinder when the base 84 begins to close the combustion space from the first cylinder. This assists with ingression and forces the displacement of more fuel/air mixture from the space above the piston crown 35 into the combustion space 20. The passage 87 can extend through the second piston from its crown, opening into a side wall of the base 84 at or adjacent the first piston crown 36, or can extend through the engine block as shown in 88 in FIG. 9A. The volume of the passage is small in comparison with the volume of the combustion space. Any one or more of the passages 87, 88, the grooves 86 may be used to assist the escape of air above piston 16 when the base 84 obstructs air flow into the combustion space.

Whilst in FIGS. 3 to 8 a base 84 is present, it is envisaged that in circumstances, e.g. where ignition delay delays the build up of pressure in cylinder 12, the use of a base 84 may not be necessary.

FIG. 9A shows a modified form of base 84 on the piston crown 36 used to achieve the same purpose as that shown in FIG. 9 and incorporating any of the features, e.g., taper, grooves etc. of the base 84 of FIG. 9.

In FIGS. 10 and 11 the smaller piston 18 is shown with four radial projections 90 extending from its crown 35 to provide sideways support for sliding contact with the wall 14a of cylinder 14. The gap 128 should be interrupted as little as possible by the projections 90 which will be dimensioned accordingly. As the projections will in effect operate as dry bearing elements for the piston crown they should be made from a suitable material which can also withstand high temperatures.

In FIG. 10A, the wall 14a of the second cylinder 14 is formed with radially inwardly directed axially extending projections 900 which provide support for the crown 35 of piston 18 in place of the projections 90 in FIGS. 10 and 11. In such a case, the projections effectively interrupt the gap 128. The projections may also be inclined to the cylinder axis but with an axial component.

In FIGS. 3 to 11, the smaller piston is substantially of a mushroom shape having a centre pillar with a crown at its upper end. FIGS. 12 and 13 illustrate an alternative construction where the crown 35 is supported by a number of circumferentially spaced pillars 100 which extend upwardly from the crown 36 of a larger piston 16. If desired the piston 18 can include a base 84 as shown in broken lines. Such an arrangement still provides a substantially open combustion space 20 as well as leaving a thin edge 37 over a substantial part of the crown 35 to facilitate the formation of the inhibiting gap 128 as shown in FIG. 13, or the provision of a seal 38 as shown in FIGS. 18A and 18B.

To promote swirl of air entering the combustion space 20 during the compression stroke, a curved projecting member 101 may be positioned beneath the crown 35, e.g. on the base 84 as shown in broken lines. The projecting member may include vanes to promote rotational flow about the axis of the piston.

A further construction for the smaller piston 18 is shown in FIG. 14 where a skirt 110 interconnects the crowns 35 and 36 in which skirt is formed with a plurality of substantial apertures 111. The apertures are preferably of varying width as shown, for example, of inverted triangular shape to maximise the circumferential length of the thin edge 37 of the crown 35. As with FIG. 12, a projecting member 101 can be provided and a base 84 can also be provided.

In the previous embodiments the engine operates on a four stroke cycle. FIG. 15 illustrates a form of the engine of the present invention which can operate on a two stroke cycle.

In FIG. 15 the inlet and exhaust valves 24 and 26 are replaced by inlet and exhaust ports 124 and 126 respectively and a spark plug 130 or glow plug is provided on wall 14a of smaller cylinder 14 for starting and/or idling. The engine is provided with the access means 30 comprising inlet valve 31 with or without the throttle valve 32. The inlet valve 31 can be cam operated or electromagnetically operated. A fuel source such as low pressure injector 34 is positioned upstream of valve 31 and can deliver fuel to an inlet duct 33 when valve 31 is either closed or open.

Smaller piston 18 is of mushroom shape although it could be of a kind shown in FIGS. 12 and 13 or FIG. 14.

In operation, air is admitted from a suitable source 132, e.g. a crankcase or external pump, to the ducts 33 and 133 at above atmospheric pressure. Duct 33 may be supplied with air from a separate source if desired. When the inlet port 124 (connected to duct 133) is uncovered by piston crown 36 as shown in broken lines, air under pressure enters the larger cylinder 12 whilst exhaust gases from a previous cycle are displaced through exhaust port 126. Simultaneously, valve 31 opens and admits air from duct 33 into the smaller cylinder 14 above crown 35. Some of that air will displace exhaust gases from the previous cycle through the inhibiting gap 128 around the crown 35. One or more cut-outs 135 may be formed in the lower end of the wall 14a of smaller cylinder 14 which bypass the second piston crown 35 when the crow 35 is at its outer dead centre position shown in broken lines. The cut-outs 135 assist in the movement of exhaust gases from the smaller cylinder 14 to the larger cylinder 12 and allow the use of the piston seal 38 whilst also allowing blow down to take place at the start of the exhaust process.

The cut-outs 135 are preferably non-continuous around the wall 14a so as to ensure that the piston crown remains in registry with the smaller cylinder 14 at its outer dead centre position. Such an arrangement is shown in FIG. 16 where interruptions 135a between the cut-outs are shown. The interruptions 135a form a continuation of the second cylinder wall 14a.

The cut-outs 135 may have an axial length "x" (FIG. 15A) smaller than the axial thickness "y" of the base 84 but greater than the edge of crown 35 of small piston 18.

Fuel may enter the smaller cylinder 14 with the air as soon as valve 31 opens but alternatively the start of the fuel delivery could be delayed until the piston 18 rises a little from its outer dead centre position to cover up the cut-outs 135 but before the exhaust port 126 is covered by the larger piston 16. The closing of valve 31 should preferably be delayed until the pressure in the larger cylinder begins to rise during the early part of the compression stroke after the exhaust port 126 is closed. In that way the Merritt segregation principle using gap 128 is assisted. If valve 31 is electromagnetically actuated, variation in closing timing may be used to control ingression instead of throttle valve 32. Towards the end of the compression stroke, ingression of the fuel air mixture takes place through inhibiting gap 128 and possibly through the by-pass groove 39, if provided, and then even if inhibiting seal 38 is used as shown in FIG. 18. Ignition follows by contact with hot air in the combustion space 20 with or without assistance from spark plug 130 which communicates directly with combustion space 20 beneath crown 35 when the latter is near the inner dead centre position also shown in broken lines. At the end of the expansion stroke, the exhaust gases escape from the exhaust port 126 and the cut-outs 135 will assist in equalising the pressure across the small piston crown 35. In FIG. 15, the position of piston 18 is shown in various positions in full and broken lines.

It will be appreciated that the piston 18 can have a base 84 which extends above cut-outs 135 when the piston 18 is at its inner dead centre position or the piston crown 36 can have a projection 84 instead as in FIG. 9A. The two stroke cycle for the Merritt engine can operate in any of the aforesaid hybrid arrangements with both diesel and spark engine cycles. The engine can utilise the by-pass 39 as shown in FIG. 3, FIG. 3A or 3B. The engine can also utilise inhibiting means in the form of gap 128 as shown in FIG. 15 or the seal 38 as shown in FIG. 18. There is no need to use inlet valve 31 as an exhaust valve.

FIG. 16 shows a practical version of the two stroke engine shown in FIG. 15.

In FIG. 16, an engine cylinder block 40 is formed with cooling galleries 41 similar to that shown in FIG. 4. The cylinder block defines the large and small cylinders 12, 14, inlet port 124 and exhaust port 126. The inlet valve 31 is operated by a cam shaft 43 in this example and is slidably mounted in a conventional type of valve guide 44. The valve 31 is held in its closed position by a conventional type of valve spring 46 shown in broken lines.

Air to the inlet port 124 and the duct 33 is supplied from a suitable source, e.g., a crankcase (not shown) of the engine. Alternatively, air may be supplied by a blower or the like.

The pistons 16, 18 are connected to a crank C.

The operation of the engine shown in FIG. 16 is identical to that shown in FIG. 15 and corresponding parts carry the same reference numerals.

Whilst in the preceding embodiments reference has been made to the use of an access means 30 including a further valve 31, such an access means may be omitted as shown in FIG. 17. this may be the case when fuels of very high latent heat capacities, e.g. methanol, are used since these are capable of cooling the air in the smaller cylinder above piston crown 35 very effectively to promote segregation without the aid of the access means to control ingression timing.

In FIG. 17 the arrangement of the pistons 16, 18 in respective cylinders 12, 14 is similar to that described hereinbefore, e.g. with respect to FIG. 3. Air inlet and exhaust valves 24, 26 are provided or alternatively ports 124 and 126. The smaller piston 18 is of a mushroom type which can have the various features described earlier e.g. a base 84. Alternatively the piston 18 may be of a kind shown in FIGS. 10 and 11, 10a, 12 and 13 or 14. A fuel injector 160 capable of withstanding combustion pressures is provided to deliver fuel directly into the smaller cylinder 14 during the induction stroke or during the induction and compression stroke.

During the induction stroke some air enters the smaller cylinder space above the crown 35 through the inhibiting gap 128. An additional inhibiting passage 128a may be provided as an aperture in the crown. The hole 128a may be substantially filled by, for instance, a protruding spark plug 162 or glow plug, or a diesel type fuel injector. As the piston reaches near its inner dead centre position. It will be appreciated that in this embodiment the inhibiting means must be a gap 128 (or 128a) to allow air into cylinder 14 during the induction stroke as well as exhaust gas transfer.

Near the end of the compression stroke, ingression of vaporised injected fuel and air will occur through inhibiting gap 128, by-pass means 39 and any gap between the plug and hole 128A. Ignition will follow ingression in the way described in relation to earlier embodiments.

Whilst specific reference has been made to gas dynamic segregation FIG. 18 shows a further embodiment in accordance with the invention which operates on a mechanical segregation principle but which still allows fuel to vapourise during the induction and compression strokes prior to ignition.

In FIG. 18 the edge 37 of the second piston 18 carries a piston ring 38 to seal the gap between the second piston and the second cylinder wall. This forms the inhibiting means as previously mentioned until the crown of the piston uncovers the bypass 39. It will be appreciated that in such a case the bypass 39 provides the entire passageway for ingression since the use of a piston ring 38 will inhibit ingression until the piston ring moves to a position beyond the lower edge of the bypass 39 as shown in FIG. 18A whereupon the gases in the second cylinder 14 can transfer to the combustion space 20.

In this arrangement the gap 128 is replaced by a seal 38 and ingression of the fuel/air mixture from the second cylinger 14 into the combustion space is triggered by the movement of the second piston crown into the bypass 39. The flow control valve 32 can be dispensed with as the pressure difference across the second piston crown becomes less critical to the process of segregation.

A bypass groove 135 is provided as described with reference to FIG. 3 to equalise pressure during the exhaust blow down period. The use of base 84 and passage means 87, 88 as shown in FIG. 9, 9A is also possible.

A second exhaust valve 150 may be provided for the second cylinder 14. The exhaust valve 150 communicates with an exhaust duct 151. Alternatively, it may communicate with the inlet duct 33 to contain unburned fuel within the engine.

It will be appreciated that the second exhaust valve 150 is not essential and that inlet valve 31 may be used as both inlet and exhaust valve.

Figure 1:
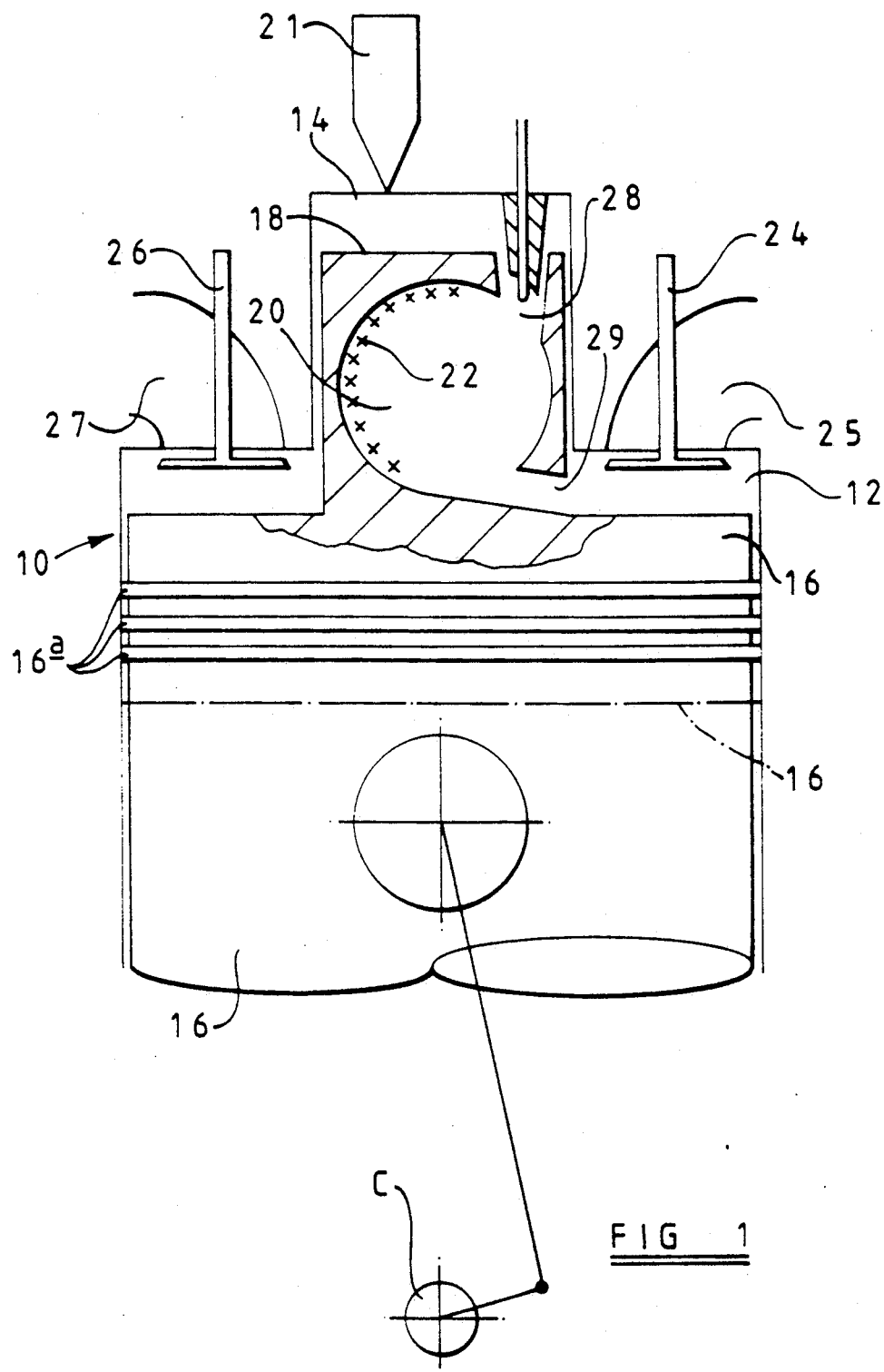
Figure 2:
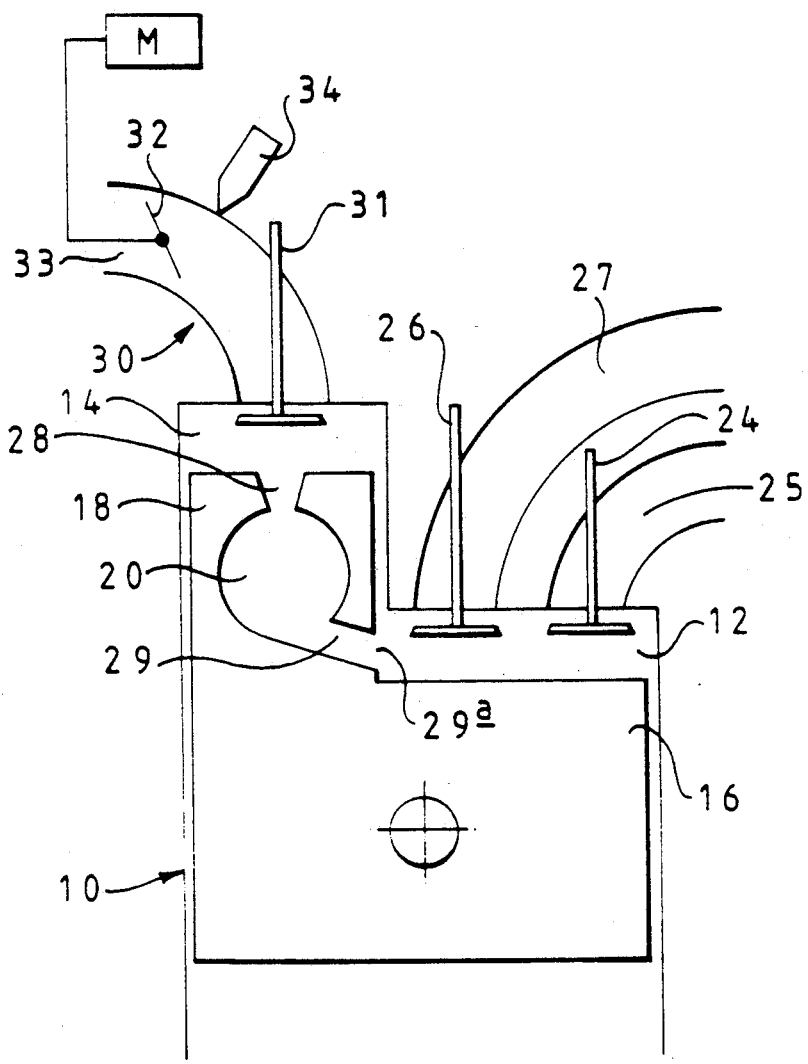
Figure 3:
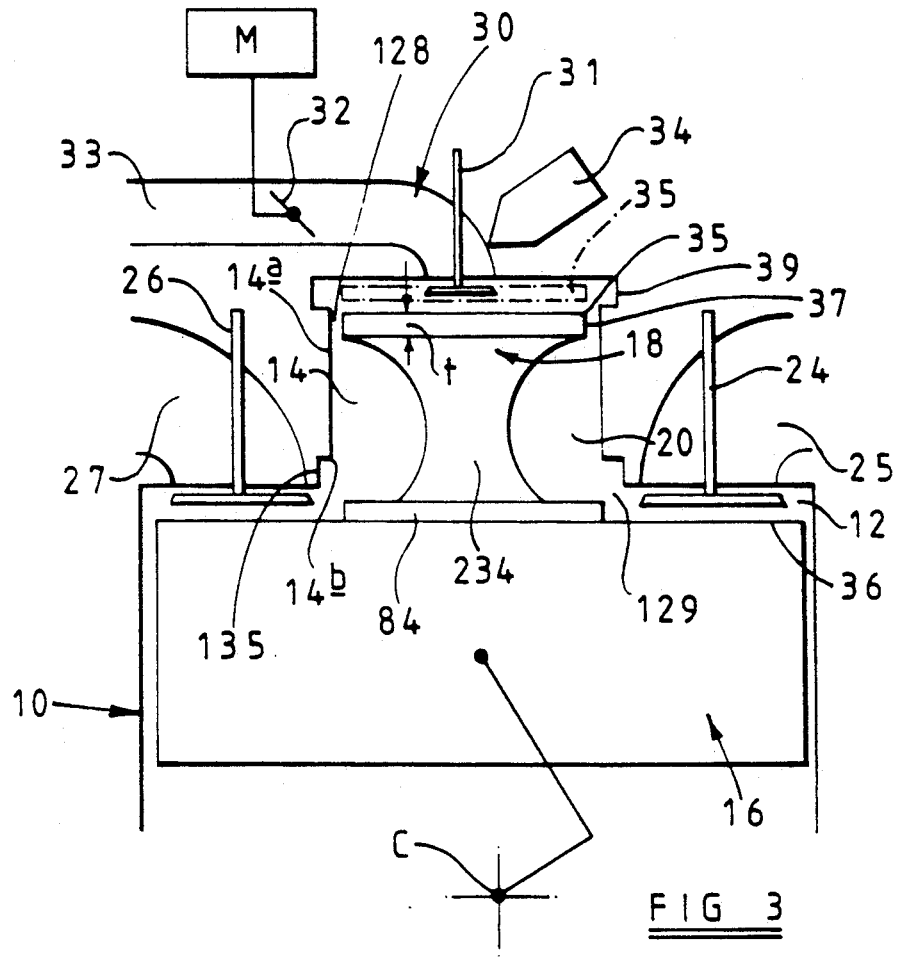
Figure 3A:
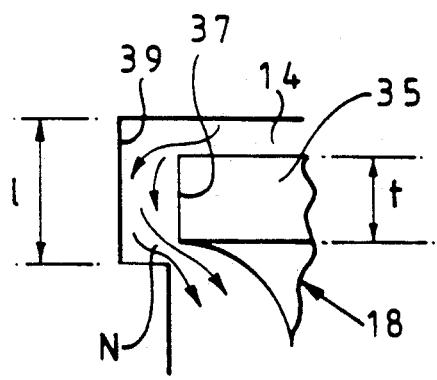
Figure 3B:
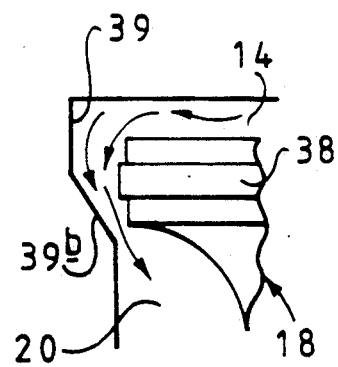
Figure 4:
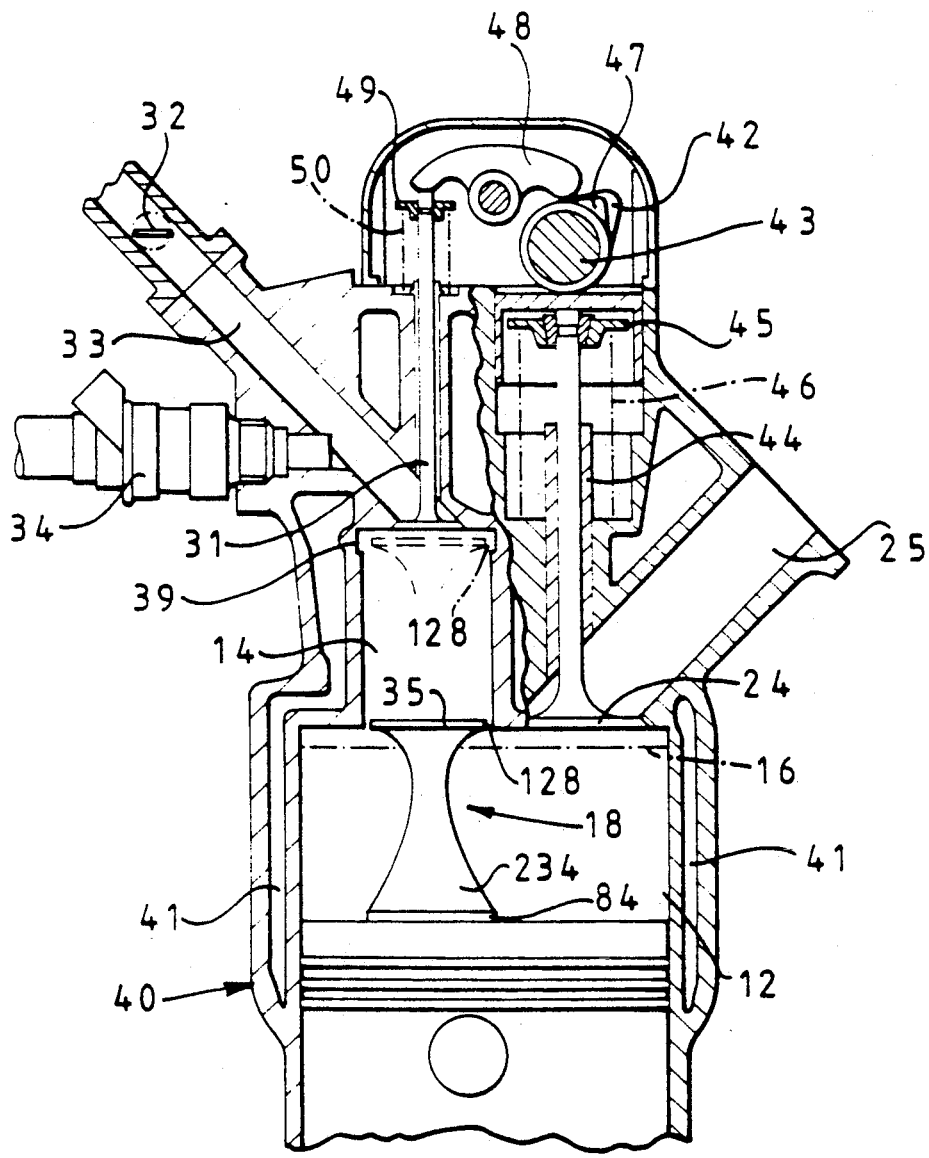
Figure 5:
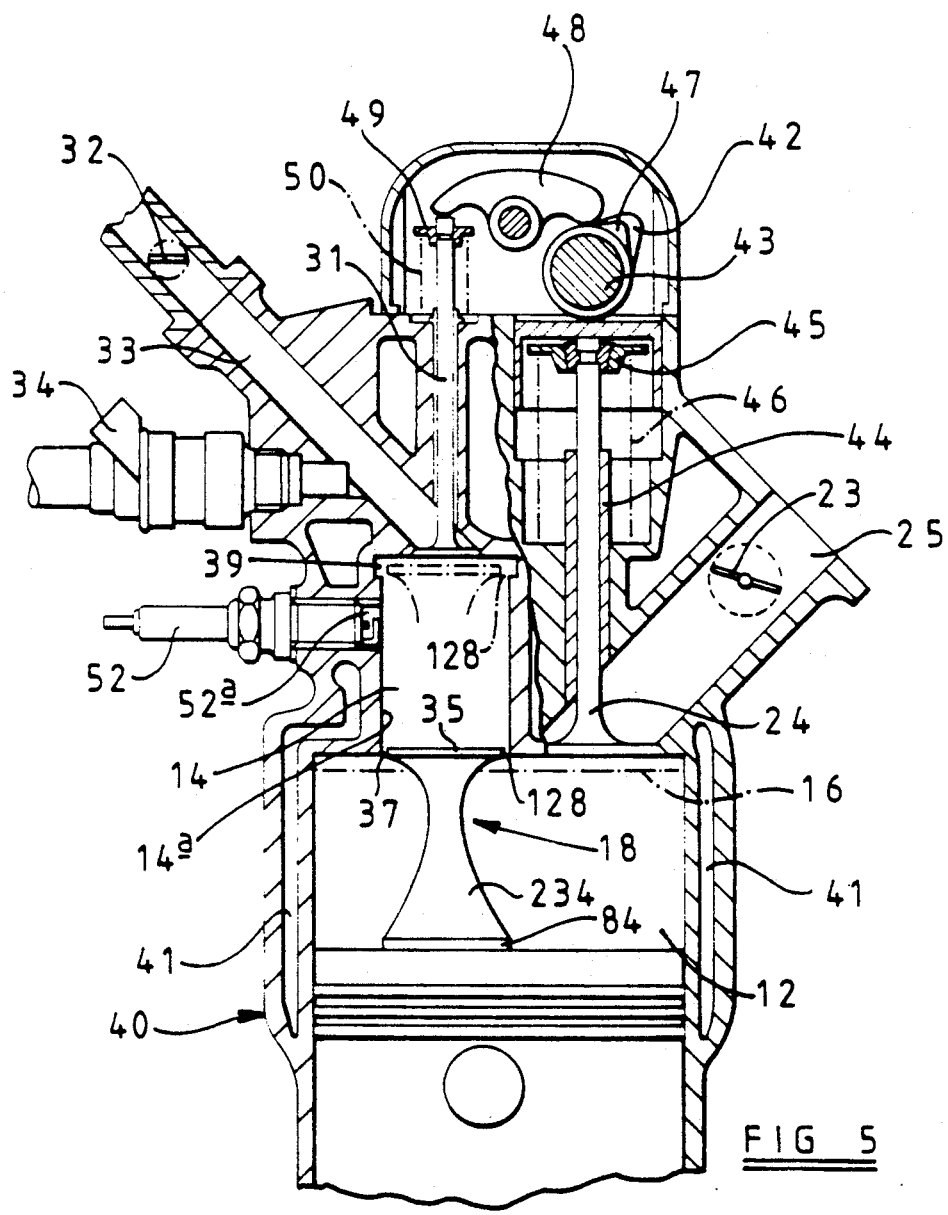

A combustion space 220 is defined in the crown 36 of the larger piston 16. An access means including an inlet valve 31, and a throttle valve 32 is provided. A fuel injector 34 is provided upstream of valve 31 to inject fuel into an inlet passage 33 and a second fuel injector 60 of a high pressure type delivers fuel directly to the combustion space. An inhibiting port 228 is defined between the larger and smaller cylinders.

Figure 6:
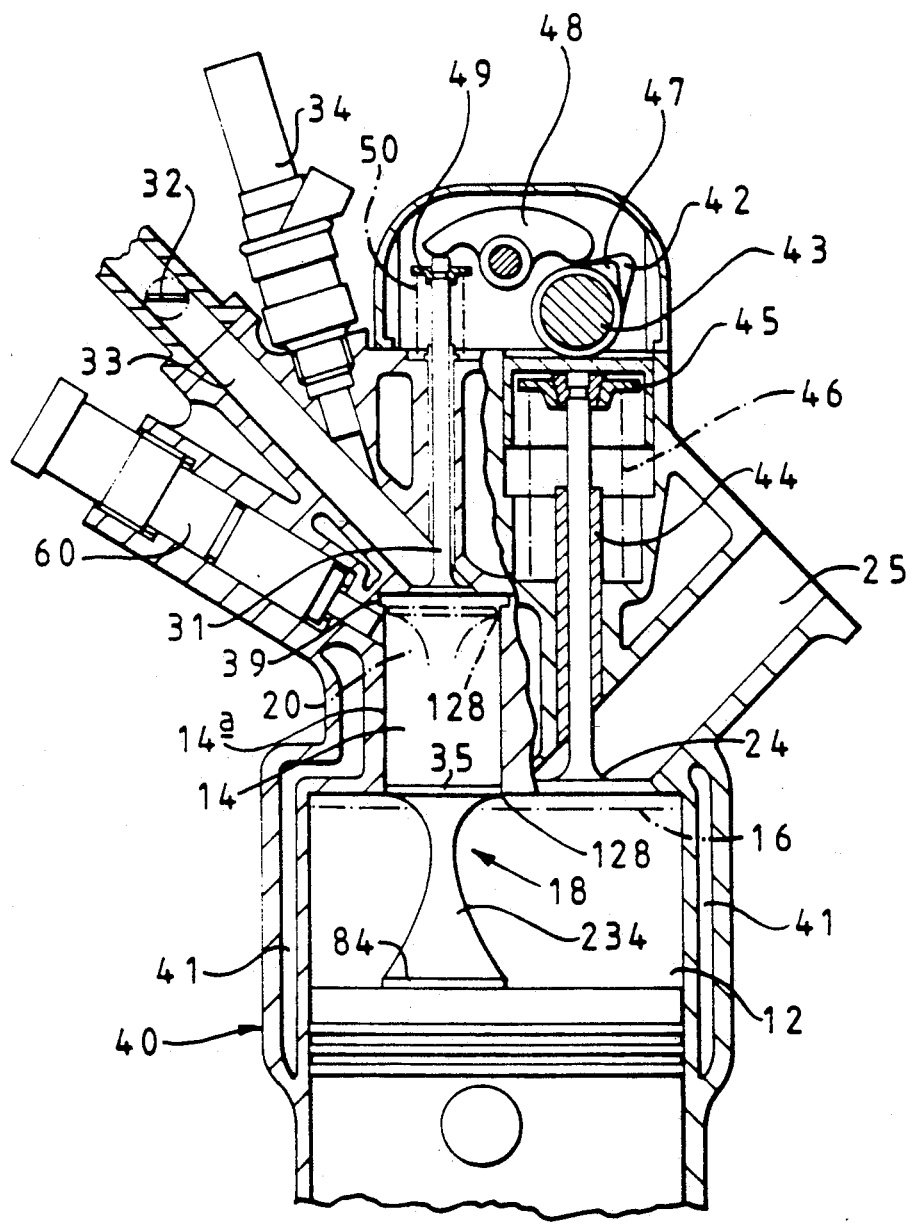
Figure 7:
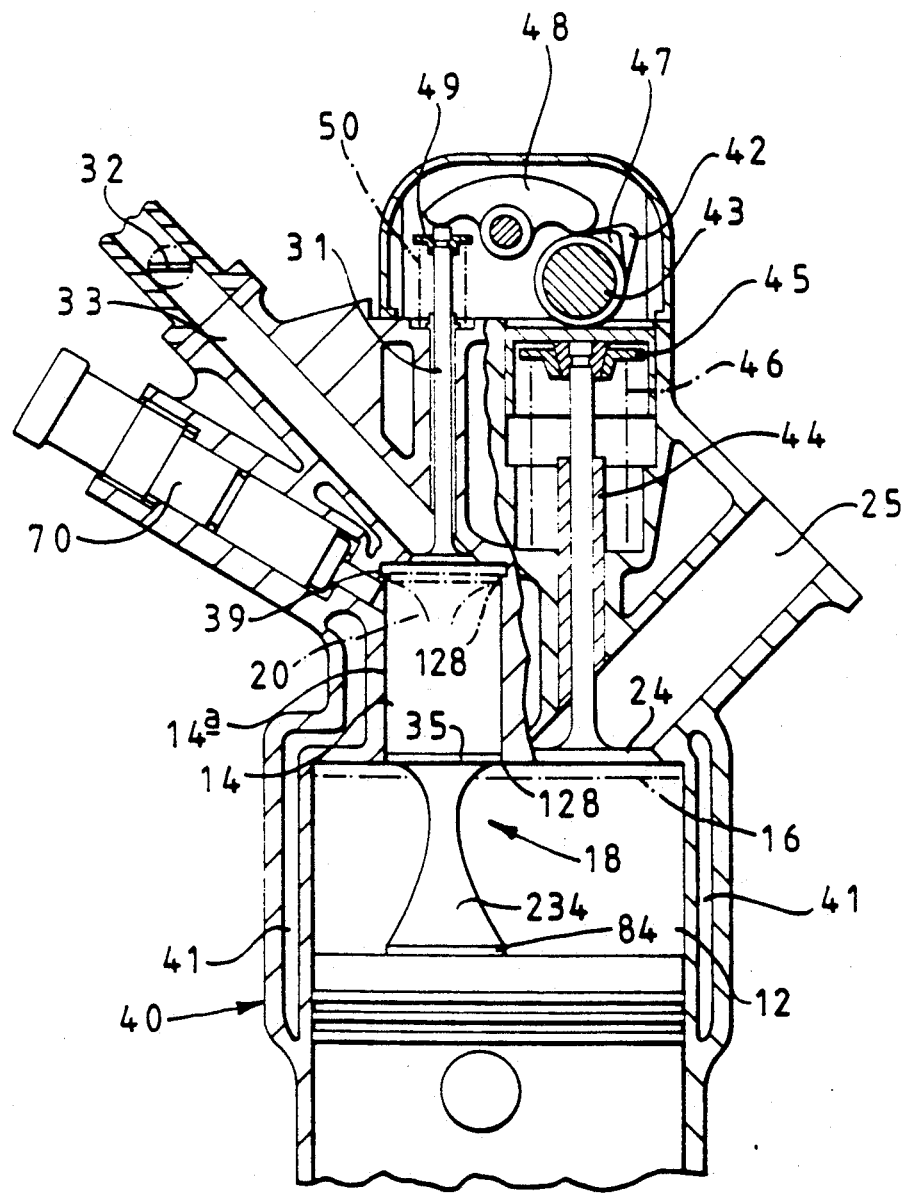
Figure 8:
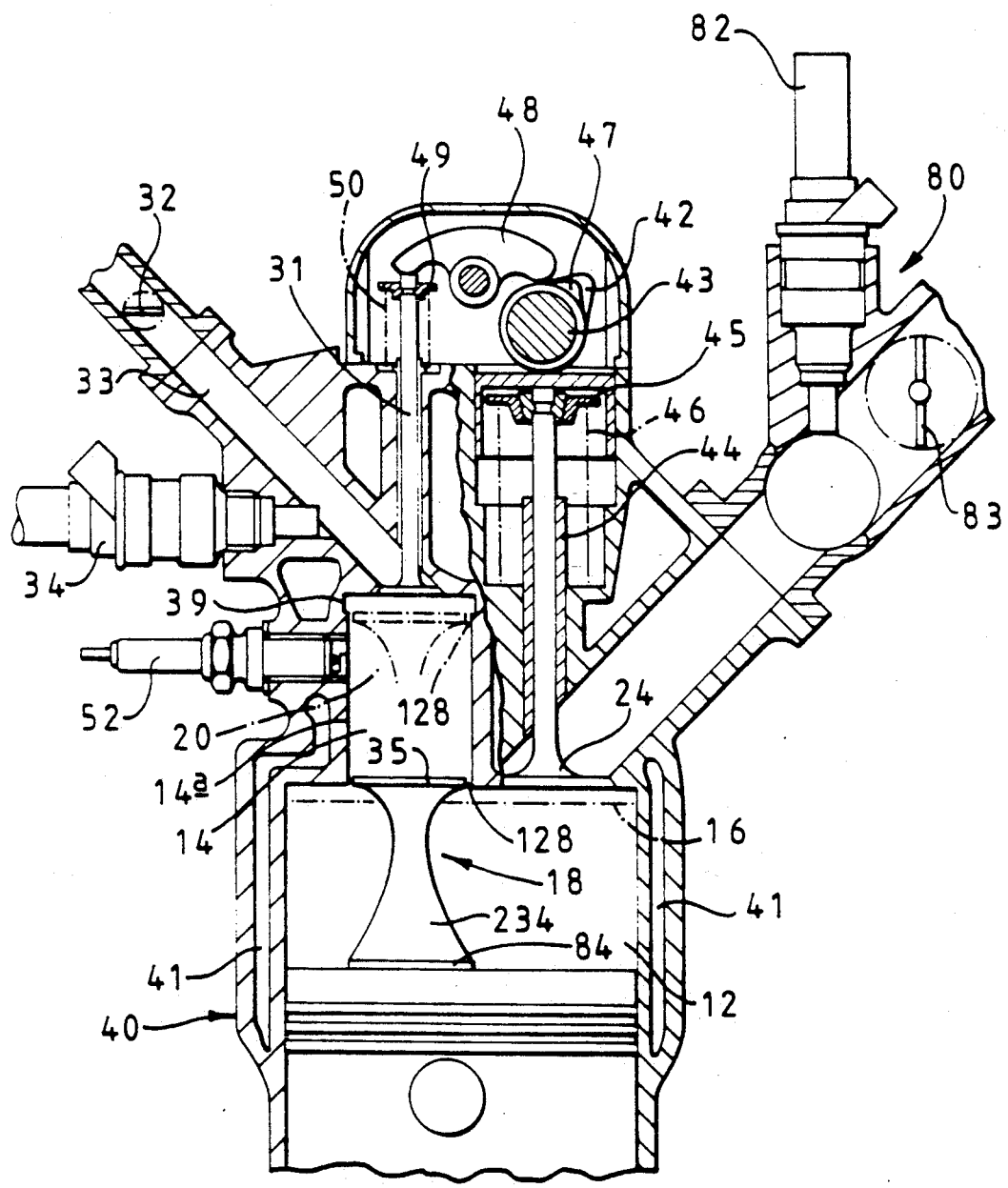
Figure 8A:
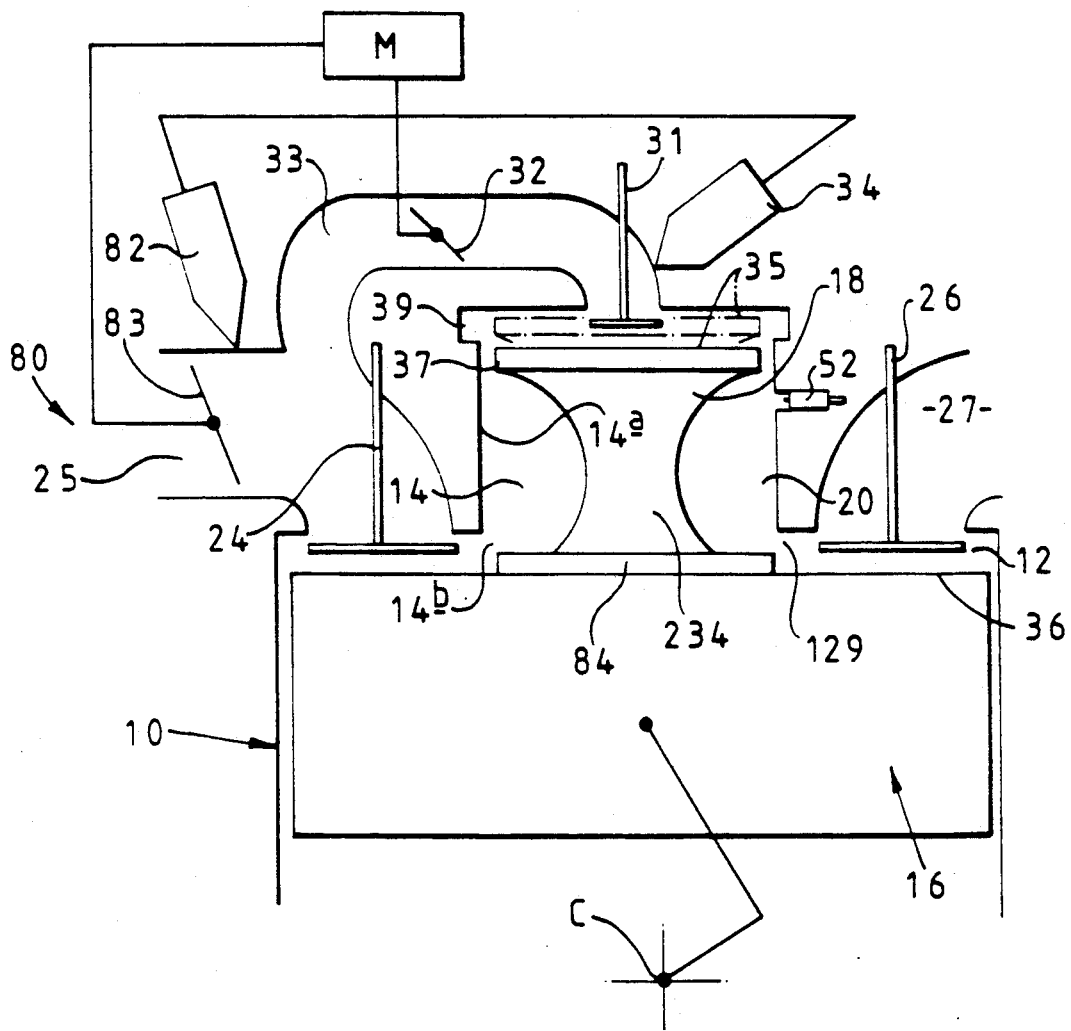
Figure 9:
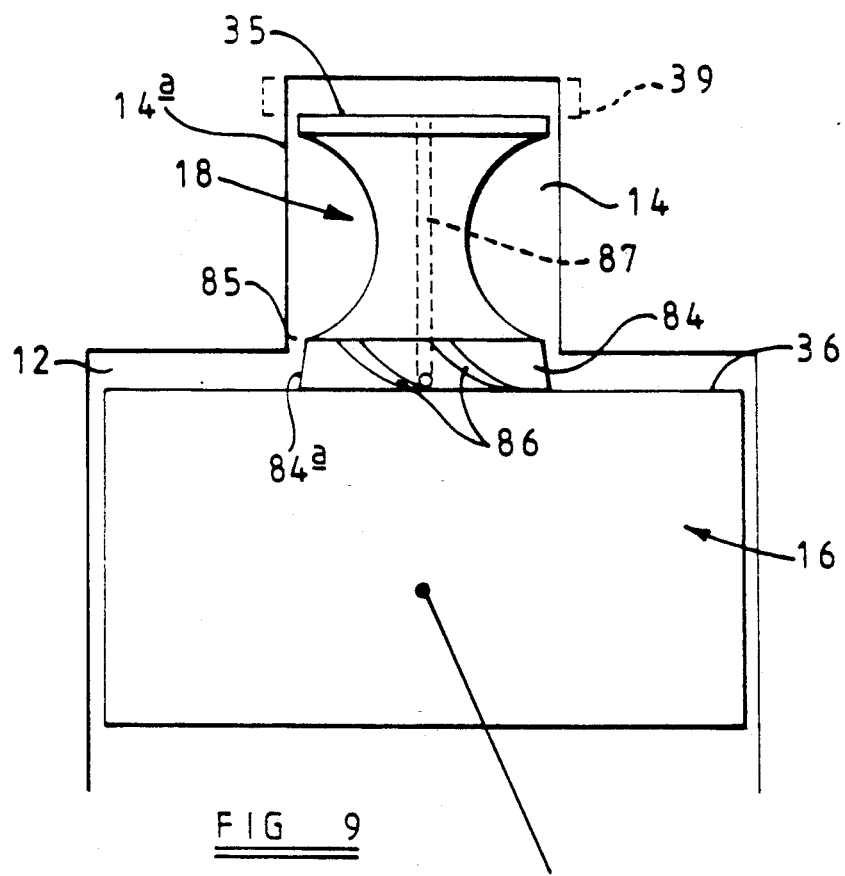
Figure 9A:
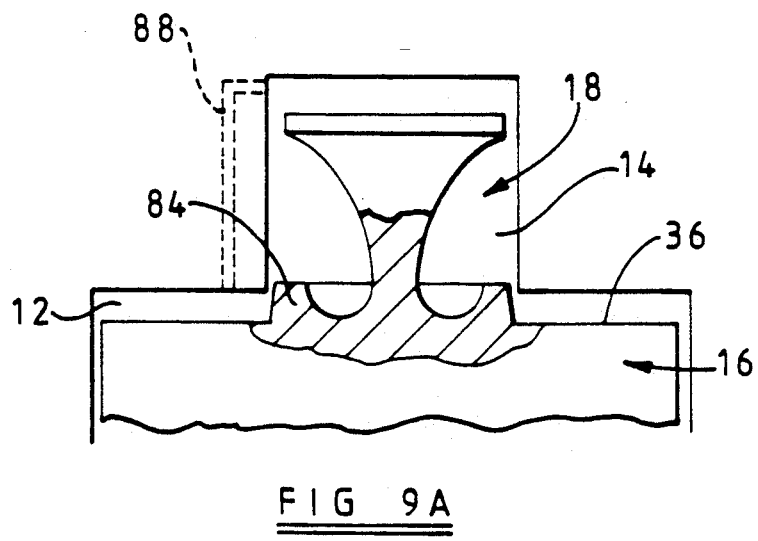
Figure 11:
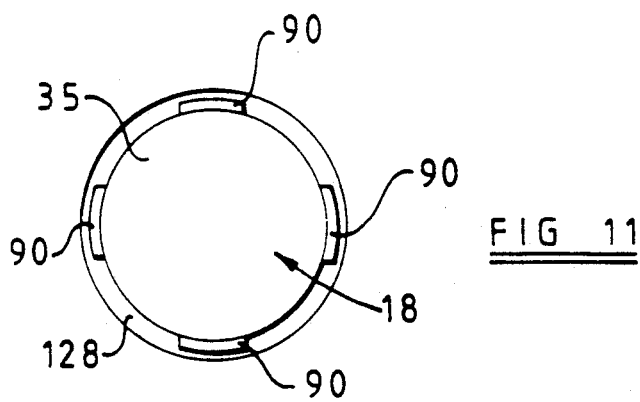
Figure 10:
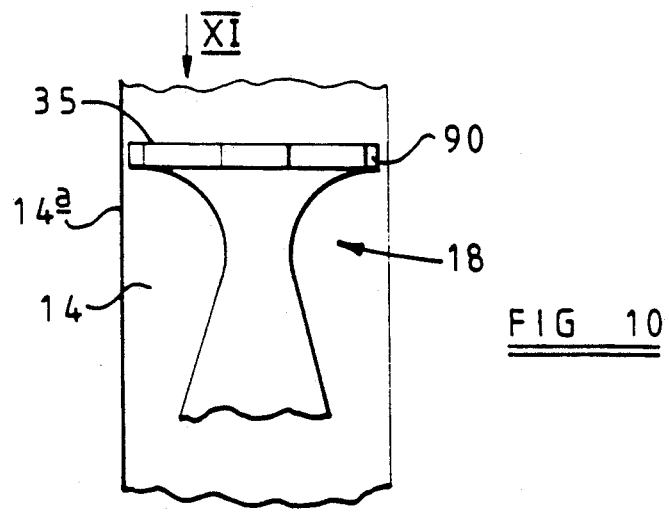
Figure 10A:
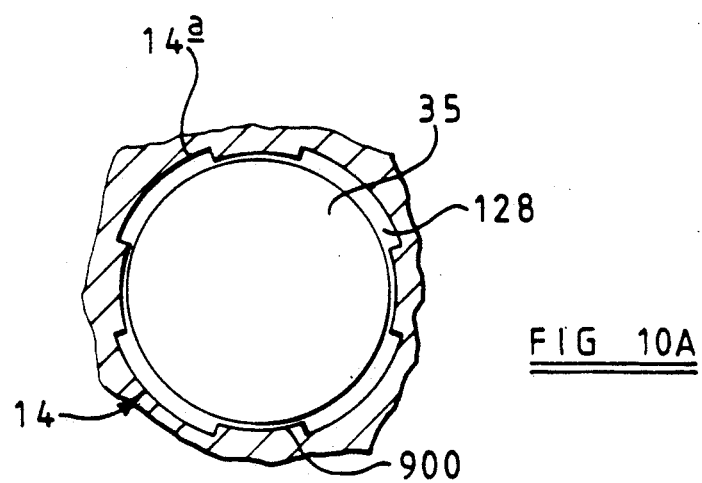
Figure 12:
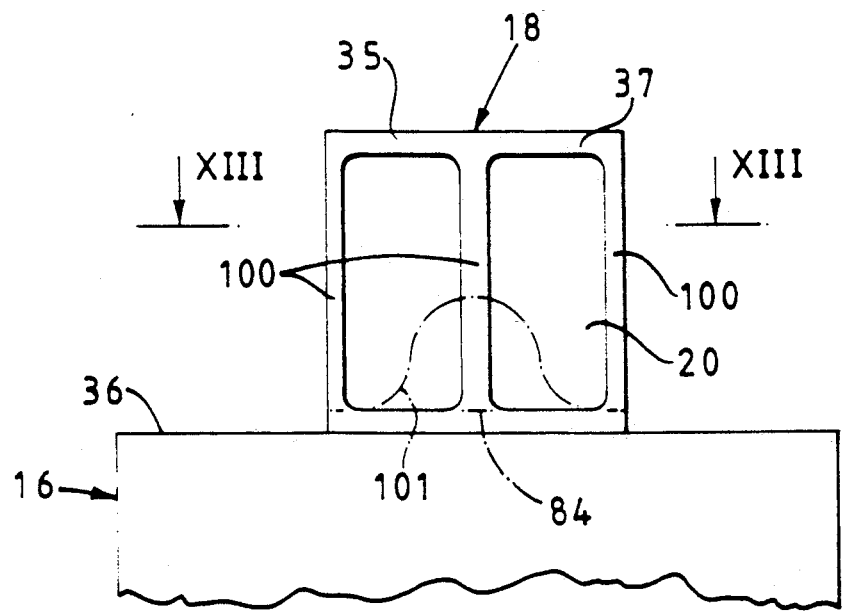
Figure 13:
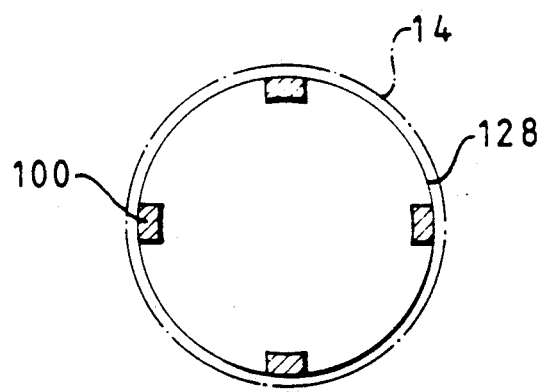
Figure 14:
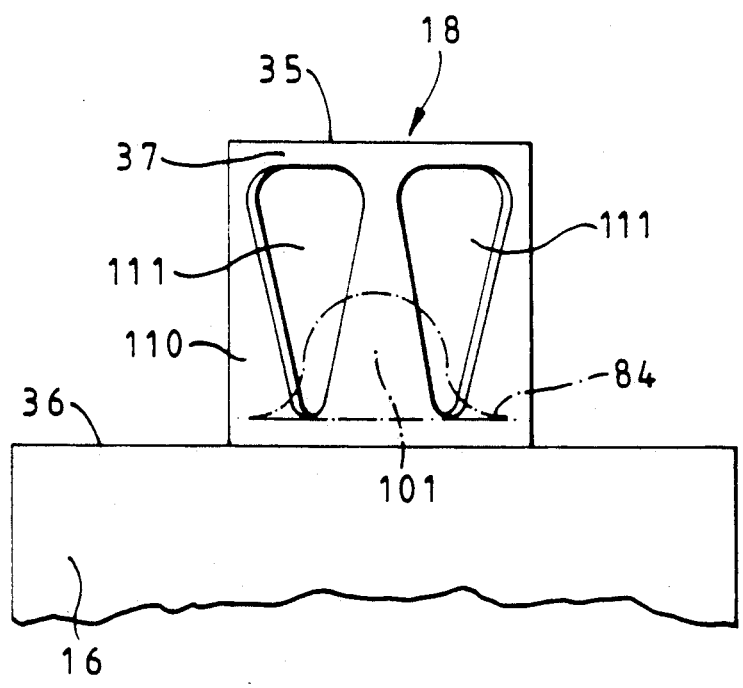
Figure 15:
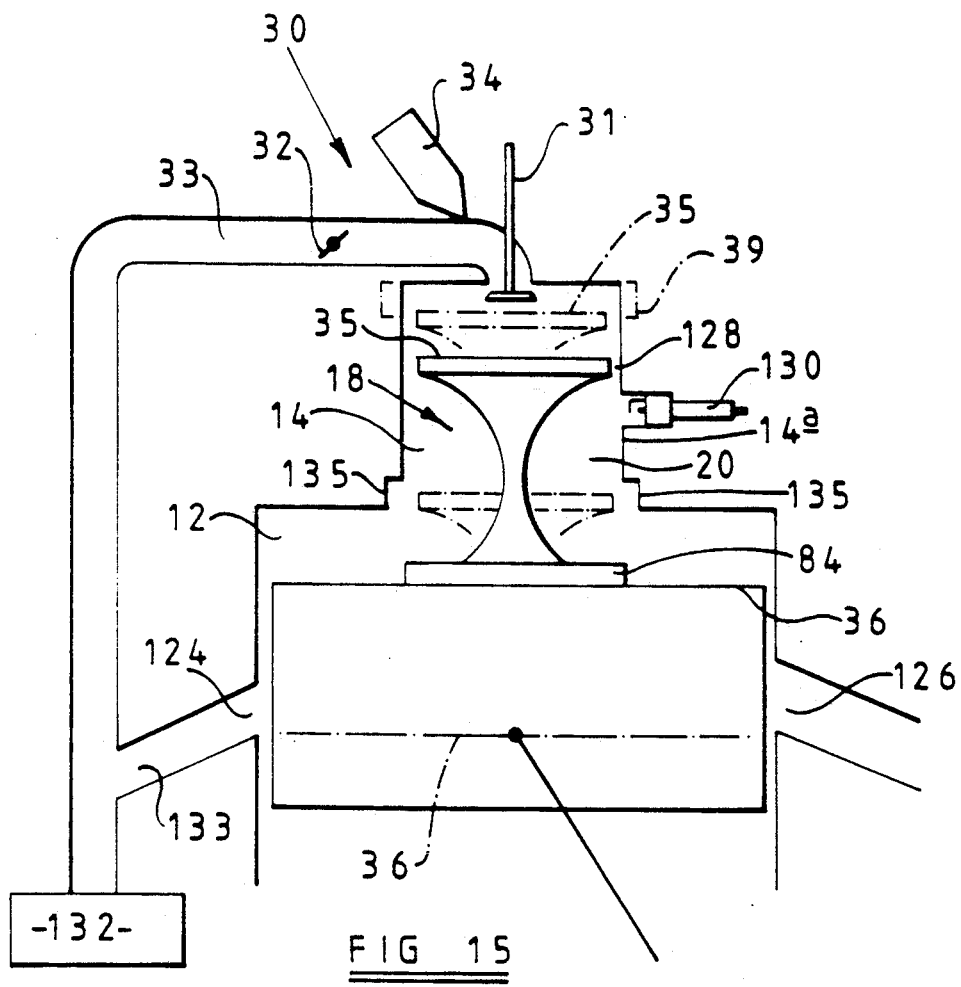
Figure 15A:
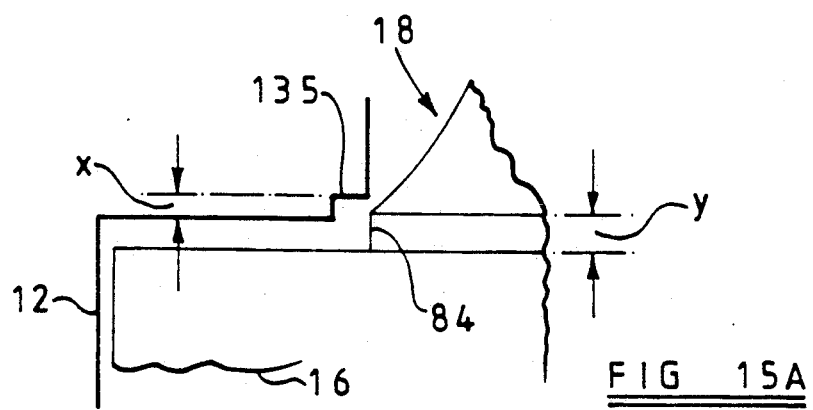
Figure 16:
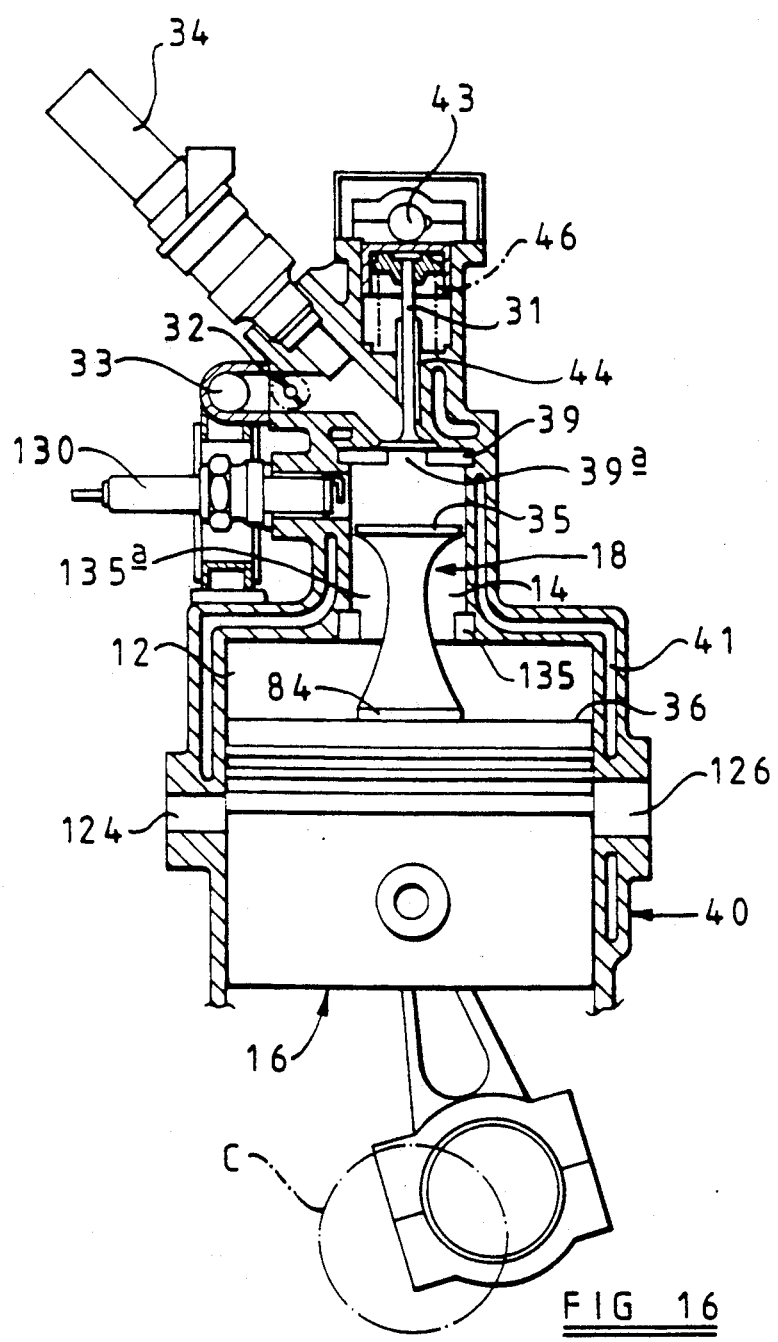
Figure 17:
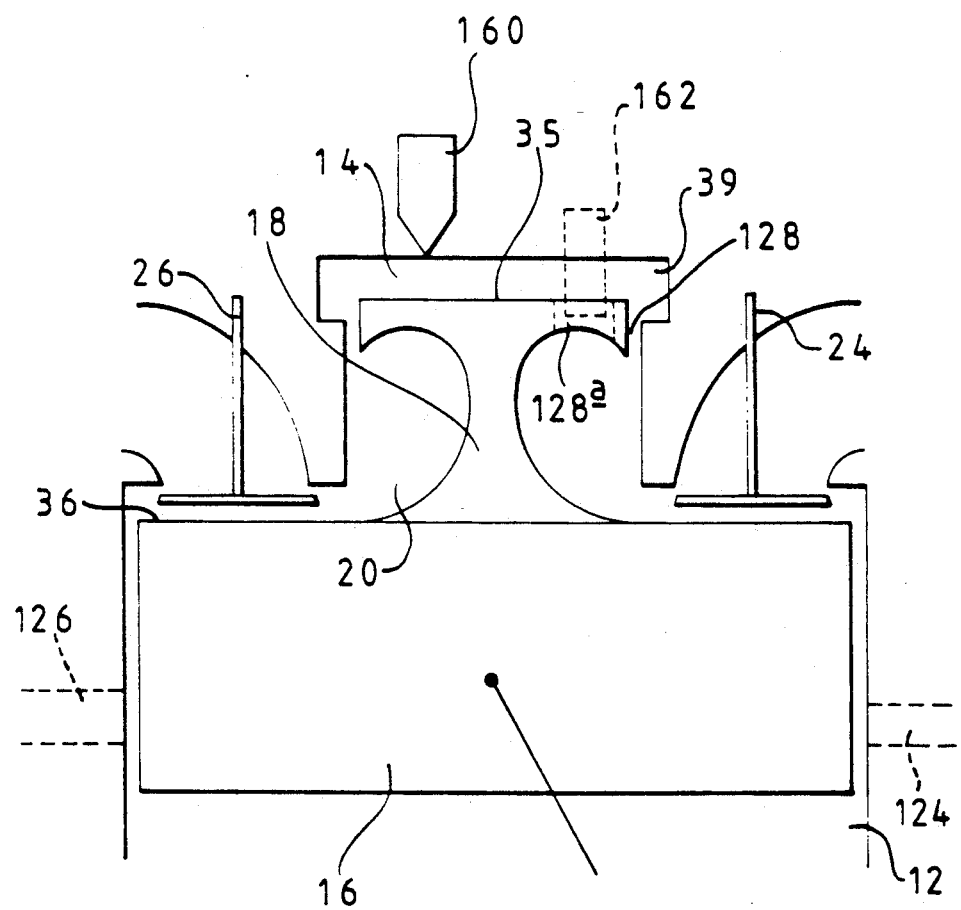
Figure 18:
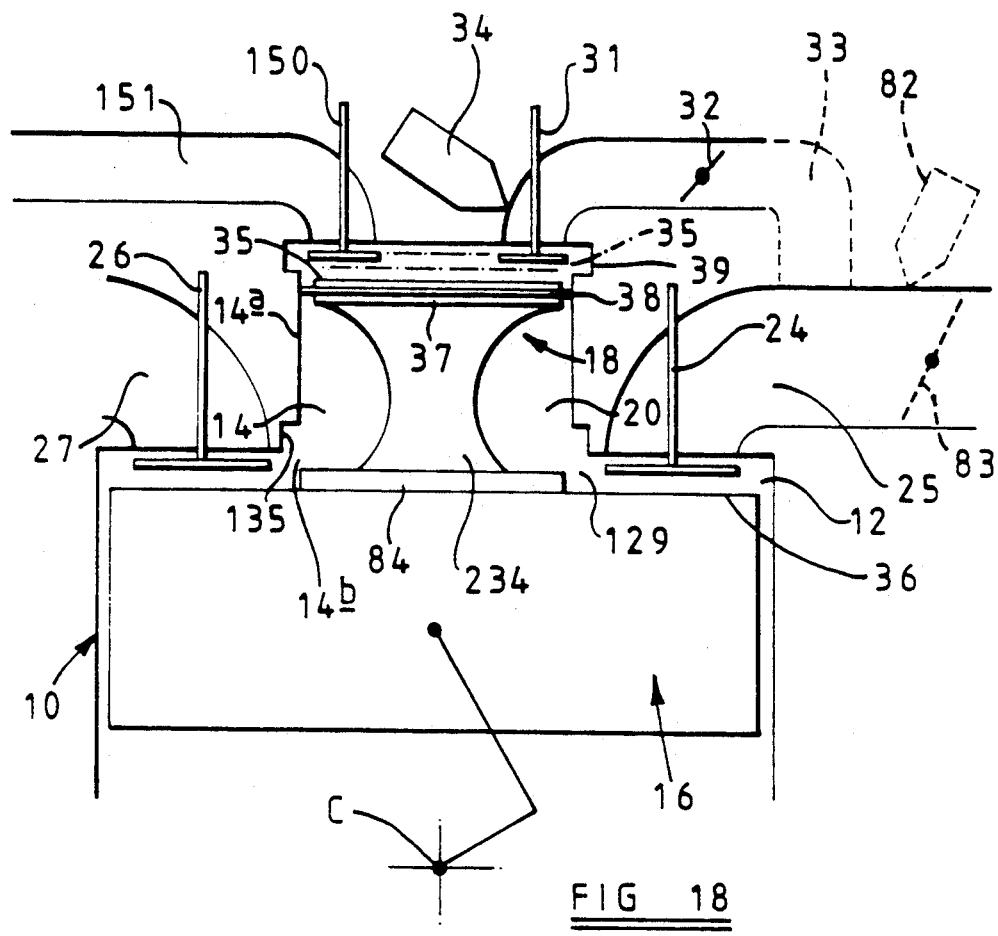
FIGS. 18A and 18B show enlarged views of the bypass 39 which may be formed as a discreet groove in the second cylinder wall (FIG. 18A) or as a gradual increase of the diameter of the bore of the second cylinder 14 (FIG. 18B).
Figure 18A:
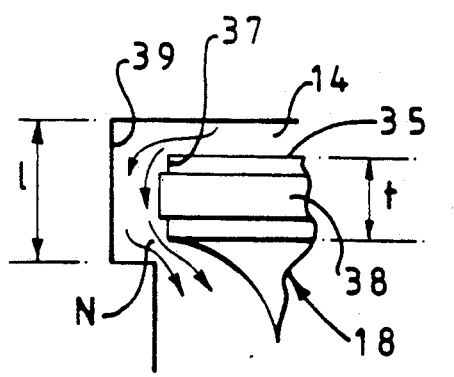
Figure 18B:
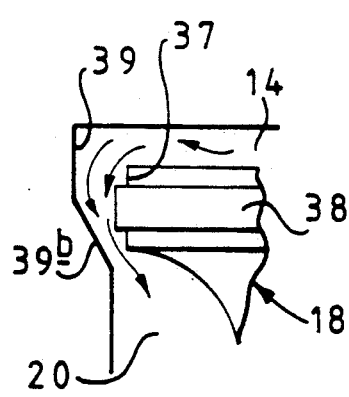
Figure 19:
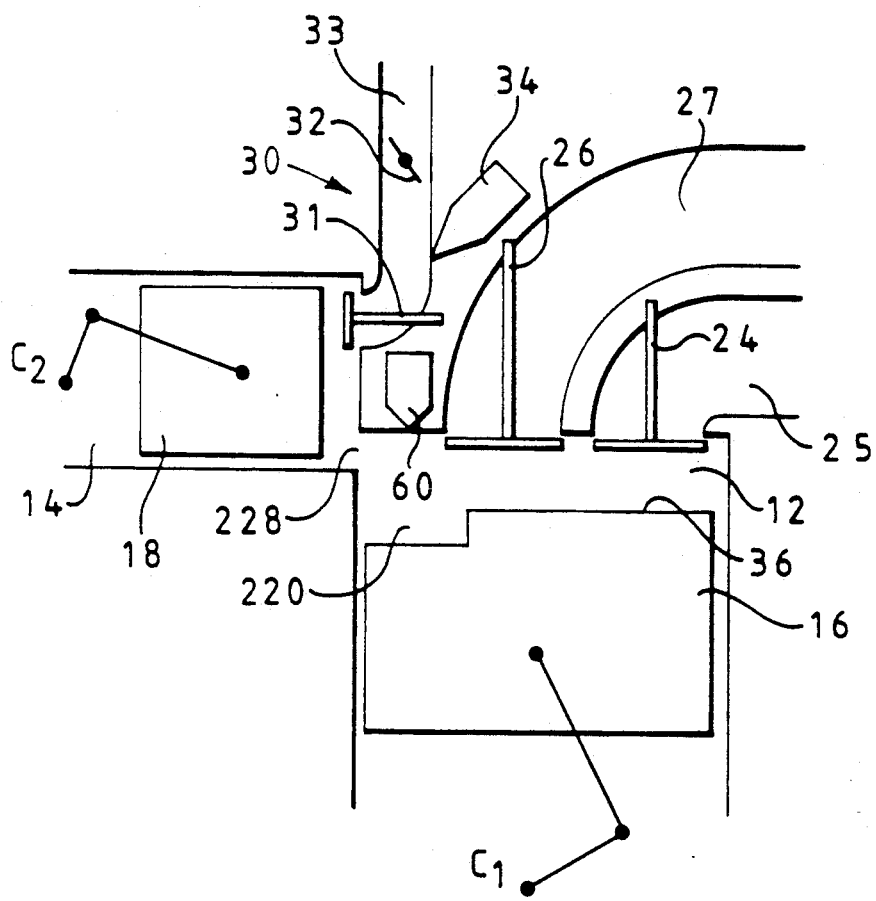
FIG. 19 shows an arrangement where two pistons 16, 18 have respective crankshafts (C1, C2) coupled together in phase or slightly out of phase. The system is similar to that shown in FIG. 6 describing one form of diesel/Merritt hybrid.

During the induction stroke fuel and air enter smaller cylinder 14 through valve 31 and substantially air only enters the large cylinder 12 through valve 24. Throttle valve 32 is used to control the pressure in cylinder 14 to be slightly below the pressure in cylinder 12 at the end of the induction stroke. During the compression strokes of both pistons both inlet valves 24, 31 close and during ingression, at the end of the compression strokes, fuel and air are transferred through ports 228 to combustion space 220 where the fuel is ignited by contact with hot air. The high pressure injector then delivers the remaining required fuel charge into the combustion chamber space 220 where it burns rapidly similar to the manner described with respect to FIG. 6.

The term "valve" as used herein embraces a port.

The term "air" as used herein includes any suitable mixture of oxygen with other usually inert gases as well as substantially pure oxygen for combustion with gaseous or liquid (i.e. vaporised liquid) fuel. It may contain recirculated exhaust gases, crankcase gases and a small proportion of hydrocarbon substances present in recirculated internal combustion engine gases.

The term "ingression" as used herein refers to the movement of fuel/air mixture from the second cylinder into the combustion space at or adjacent the inner dead centre piston positions at the end of the compression stroke.

It will be appreciated by those skilled in the art that features of each of the described embodiments may be interchanged where suitable.

I claim:

1. An internal combustion engine comprising:
   at least one set of first and second cylinders, the first cylinder having a larger swept volume than the second cylinder;
   respective first and second pistons movable in said cylinders;
   air inlet means communicating with the first cylinder;
   exhaust means communicating with the first cylinder;
   a first fuel source for providing fuel to the second cylinder;
   means defining a combustion space when the pistons are substantially at the inner dead centre position, the combustion space communicating with both cylinders during the expansion stroke;
   inhibiting means for inhibiting ingression prior to the second piston arriving at or adjacent its inner dead centre position;
   and wherein the second piston has a crown which is spaced from and connected to the crown of the first piston and which has an edge which is relatively small in the axial direction compared to the distance between the first piston crown and the second piston crown in the axial direction, thereby to define said combustion space between said piston crowns and a side wall of said second cylinder.

2. An internal combustion engine according to claim 1 in which the second piston crown always remains within the second cylinder.

3. An internal combustion engine according to claim 1 in which the second piston crown is spaced from and connected to the first piston crown by at least one pillar.

4. An internal combustion engine according to claim 3 in which a pillar is provided substantially centrally in relation to said second piston crown.

5. An internal combustion engine according to claim 4 in which the central pillar is so shaped to provide a curved wall for said combustion space.

6. An internal combustion engine according to claim 3, 4 or 5 in which a plurality of circumferentially spaced pillars is provided so as to leave a plurality of second piston crown portions having relatively small edges in the axial direction.

7. An internal combustion engine according to claim 1 in which the second piston has a cylindrical skirt extending between its crown and the first piston, said skirt being formed with apertures of substantial size which leave a plurality of second piston crown portions having relatively small edges in the axial direction.

8. An internal combustion engine according to claim 1 in which a projecting member is provided on the first piston beneath the crown of the second piston to promote swirling of gas in the combustion space.

9. An internal combustion engine according to claim 1 in which the second piston is positioned eccentrically relative to the first piston.

10. An internal combustion engine according to claim 3 further comprising a raised portion on said first piston crown dimensioned to fit with working clearance into the second cylinder in order nearly to shut off the combustion space from the first cylinder when the pistons are at or adjacent the inner dead centre position.

11. An internal combustion engine according to claim 10 in which the axial length of said raised portion is substantially equal to the distance that the pistons move between start of said ingression and the inner dead centre position.

12. An internal combustion engine according to claim 10 in which said raised portion has a radially outer side wall which diverges away from the second cylinder wall.

13. An internal combustion engine according to claim 12 in which said radially outer side wall tapers or curves away from said second cylinder wall.

14. An internal combustion engine according to any of claims 10 to 13 in which said raised portion has a radially outer side wall formed with one or more grooves extending in a direction from the crown of the first piston towards an upper face of said raised portion.

15. An internal combustion engine according to any of claims 10 to 13 in which passage means are provided interconnecting the space above the crown of the second piston with said first cylinder for enabling transfer of air from the first cylinder to the second cylinder when the pistons are adjacent the inner dead centre position for assisting ingression.

16. An internal combustion engine according to claim 15 in which said passage means is formed in said second piston.

17. An internal combustion engine according to claim 1 in which the edge of the second piston crown is radially spaced from the adjacent wall of the second cylinder to define a gap therebetween which comprises said inhibiting means.

18. An internal combustion engine according to claim 17 in which the gap is a continuous annular clearance between said edge of the second piston crown and the adjacent wall of the second cylinder.

19. An internal combustion engine according to claim 17 or 18 in which said gap is interrupted by two or more radial projections on at least one of said second piston crown and a wall of the second cylinder which may slidably engage with the other of said second piston crown and said wall of said second cylinder to provide support for the second piston.

20. An internal combustion engine according to claim 1 in which a layer of catalytic material is placed at a selected location in the combustion space.

21. An internal combustion engine according to claim 1 in which the second cylinder is formed at its end remote from the first cylinder with means defining a first by-pass around the edge of the second piston crown when the second piston is at or adjacent its inner dead centre position.

22. An internal combustion engine according to claim 21 in which said first by-pass means has an axial length greater than the thickness of the edge of said second piston crown.

23. An internal combustion engine according to claim 22 in which said first by-pass means is a groove formed in the wall of the second cylinder extending over at least a portion of the circumference of the second cylinder.

24. An internal combustion engine according to claim 21, 22 or 23 in which said first by-pass means is defined by an abrupt or gradual enlargement of the bore of the second cylinder.

25. An internal combustion engine according to claim 21, 22 or 23 wherein said inhibiting means comprises the spacing between said second piston crown and the second cylinder side wall, said spacing being of a size such as substantially to prevent the passage of gas between said side wall and said second piston crown.

26. An internal combustion engine according to claim 21, 22 or 23 in which said inhibiting means comprises sealing means on said edge of said second piston crown for slidably and sealingly engaging the second cylinder side wall.

27. An internal combustion engine according to claim 26 wherein said sealing means comprises a piston ring.

28. An internal combustion engine according to claim 1 further comprising means for assisting ignition of the fuel in said combustion space.

29. An internal combustion engine according to claim 28 wherein said ignition assisting means comprises a spark plug, catalyst or other ignition device.

30. An internal combustion engine according to claim 21, 22 or 23 in which the second cylinder is formed at its end nearest the first cylinder with means defining a second bypass around the edge of the second piston crown when the second piston is at or adjacent its outer dead centre position.

31. An internal combustion engine according to claim 30 in which said second by-pass means has an axial length greater than the thickness of the edge of said second piston crown.

32. An internal combustion engine according to claim 31 in which said second by-pass means is a groove formed in the wall of the second cylinder extending over at least a portion of the circumference of the second cylinder.

33. An internal combustion engine according to claim 30 in which said second by-pass means is defined by an abrupt or gradual enlargement of the bore of the second cylinder.

34. An internal combustion engine according to claim 1 having access means associated with the second cylinder for admitting air, with or without fuel or for admitting a gaseous fuel with or without air to the second cylinder during induction, said access means comprising a first port means opening into said second cylinder and a first valve means for controlling said port means.

35. An internal combustion engine according to claim 34 in which said first port means serves as both inlet and exhaust port for said second cylinder.

36. An internal combustion engine according to claim 34 in which said access means further comprises a second, exhaust port means for said second cylinder, and second valve means for controlling said second port means.

37. An internal combustion engine according to claim 36 in which said second, exhaust port means communicates with said first port means for providing exhaust gas recirculation.

38. An internal combustion engine according to claim 34 in which said valve means is a poppet valve operable mechanically or electrically.

39. An internal combustion engine according to any of claims 34 to 38 in which the access means includes a first variable flow area valve means upstream of the first valve means.

40. An internal combustion engine according to claim 39 in which the variable flow area valve means is a butterfly or throttle valve.

41. An internal combustion engine according to claim 40 in which the first fuel source is positioned upstream of the first valve means.

42. An internal combustion engine according to claim 41 in which the first fuel source is a liquid fuel injector.

43. An internal combustion engine according to any of claims 34 to 38 in which control means is provided for controlling timing the introduction and duration of fuel delivery from the first fuel source such that fuel is introduced during a period in which the first valve means is either open or closed.

44. An internal combustion engine according to any of claims 34 to 38 having control means for controlling said access means to control pressure in the second cylinder to a value below the pressure in the first cylinder during an early part of the compression stroke, thereby to inhibit ingression prior to the pistons arriving adjacent the inner dead centre position.

45. An internal combustion engine according to claim 44 in which said control means is operable to close said first valve means at a preselected piston position after closure of said air inlet means of the first cylinder.

46. An internal combustion engine according to claim 1 in which second variable flow area valve means is positioned upstream of said air inlet means communicating with said first cylinder for enabling the restriction of air supply to said first cylinder during engine part load conditions.

47. An internal combustion engine according to claim 1 in which a second fuel source, in the form of a high pressure liquid fuel injector, is located such that when the crown of the second piston is at or adjacent its inner dead centre position said second fuel source can deliver to the combustion space a quantity of fuel under pressure in addition to fuel supplied to said second cylinder by the first said fuel source.

48. An internal combustion engine according to claim 47 having means for controlling said first fuel source to deliver a proportion of the total fuel quantity to be delivered into the second cylinder into the space above the crown of the second piston starting and finishing when said second piston is at predetermined positions spaced from the inner dead centre position, and for controlling said second fuel source to deliver a further proportion of the total fuel quantity into the combustion space when the pistons are subsequently at or adjacent the inner dead centre position.

49. An internal combustion engine according to claim 1 in which the first fuel source is a high pressure fuel injector positioned in a side wall of the second cylinder for delivering fuel directly into the second cylinder both above and below the crown of the second piston.

50. An internal combustion engine according to claim 49 having means for controlling said fuel injector to deliver a proportion of the total fuel quantity to be delivered into the second cylinder into the space above the crown of the second piston starting and finishing when said second piston is at predetermined positions spaced from the inner dead centre position, and to deliver a further proportion of the total fuel quantity into the combustion space when the pistons are subsequently at or adjacent the inner dead centre position.

51. An internal combustion engine according to claim 50 in which said fuel injector control means is operable to deliver the full quantity of fuel in two or more pulses or substantially continuously at a constant or variable rate of flow over a given period in such a way that the first said proportion of fuel is delivered into the second cylinder during the induction and/or compression stroke above the second piston crown and the said further proportion of fuel is delivered to the combustion space substantially during a period beginning with or after ingression.

52. An internal combustion engine according to any of claims 34 to 38 in which second variable flow area valve means is positioned upstream of said air inlet means communicating with said first cylinder for enabling the restriction of air supply to said first cylinder during engine part load conditions, and a second fuel source is provided in said air inlet means of said first cylinder for providing a spark ignitable fuel/air mixture to enable the engine to operate in a spark ignition mode.

53. An internal combustion engine according to claim 52 having control means for controlling said first and second fuel sources and said second variable flow area valve means to change over the engine between said spark ignition mode in which said first fuel source is inoperative or substantially inoperative and the second variable flow area valve means is partially closed to limit compression temperature to below compression ignition value and a compression ignition mode with or without spark ignition assistance in which said second fuel source is inoperative or substantially inoperative and said second variable flow area valve means is substantially fully open to raise compression temperature to enable compression ignition.

54. An internal combustion engine according to claim 1 in which second variable flow area valve means is positioned upstream of said air inlet means communicating with said first cylinder for enabling the restriction of air supply to said first cylinder during engine part load conditions, and idling of the engine can be effected by introducing fuel from the first fuel source into air delivered to the second cylinder to produce a spark ignitable mixture, and wherein said mixture is introduced into the second cylinder whilst admitting a throttled amount of substantially air only into the first cylinder and said mixture is ignited by a spark plug when the piston is in a suitable position relative to inner dead centre position.

55. An internal combustion engine according to any of claim 34 to 38 in which the engine operates on a two stroke cycle and has means for controlling said first valve means to close said first valve means during or after closure of said exhaust means.

56. An internal combustion engine according to claim 55 in which said first port means for said second cylinder and said air inlet means for said first cylinder have a common air supply.

57. An internal combustion engine according to claim 1 in which said engine is a compression ignition engine having a geometric compression ratio high enough to enable compression ignition, the compression ratio being the ratio of gas volume in the engine cylinders at outer and inner dead centre positions.

58. An internal combustion engine comprising:
at least one set of first and second cylinders, the first cylinder having a larger swept volume than the second cylinder;
respective first and second pistons movable in said cylinders;
air inlet means communicating with the first cylinder;
exhaust means communicating with the first cylinder;
a first fuel source for providing fuel to the second cylinder;
means defining a combustion space when the pistons are substantially at the inner dead centre position, the combustion space communicating with both cylinders;
inhibiting means for inhibiting ingression prior to the second piston arriving at or adjacent its inner dead centre position;
and access means associated with the second cylinder for admitting air, with or without fuel or for admitting a gaseous fuel with or without air to the second cylinder to control pressure in the second cylinder during an early part of the compression stroke, said access means comprising a first port means opening into said second cylinder and a first valve means for controlling said port means.

* * * * *